United States Patent [19]

Daniel, III et al.

[11] Patent Number: 4,972,453
[45] Date of Patent: Nov. 20, 1990

[54] AUTONOMOUS EXPERT SYSTEM FOR DIRECTLY MAINTAINING REMOTE TELEPHONE SWITCHING SYSTEMS

[75] Inventors: William F. Daniel, III, Louisville; Karen C. Loeb, Englewood; Charles S. Roush, Boulder, all of Colo.

[73] Assignee: AT&T Bell Laboratories, Murray Hill, N.J.

[21] Appl. No.: 317,232

[22] Filed: Feb. 28, 1989

[51] Int. Cl.$^5$ ............................................. H04M 3/28
[52] U.S. Cl. ....................................... 379/10; 379/15; 371/15.1; 371/18
[58] Field of Search ...................... 379/10, 15, 14, 32; 371/15.1, 18; 364/513

[56] References Cited

U.S. PATENT DOCUMENTS

| | | | |
|---|---|---|---|
| 4,456,994 | 6/1984 | Segarra | 371/15.1 X |
| 4,517,468 | 5/1985 | Kemper et al. | 290/52 |
| 4,697,243 | 9/1987 | Moore et al. | 364/513 |
| 4,701,845 | 10/1987 | Andreasen et al. | 371/18 X |

OTHER PUBLICATIONS

"Expert Systems for AT&T Switched Network Maintenance", *AT&T Technical Journal*, vol. 67, Issue 1, pp. 93-103, Paul H. Callahan.
"Operations Systems Technology for New AT&T Network and Service Capabilities", *AT&T Technical Journal*, vol. 66, Issue 3, pp. 64-72.
Expert Systems in Central Office Switch Maintenance, Macleish, Thiedke, Vennergrund, IEEE Communications Magazine, Sep. 1986 vol. 24, No. 9 pp. 26-33.

*Primary Examiner*—Stafford D. Schreyer
*Attorney, Agent, or Firm*—John C. Moran

[57] ABSTRACT

An autonomous expert system for directly maintaining remote computer systems by directly accessing the remote computer systems, diagnosing, and clearing fault conditions on those computer systems. The expert system performs those functions by first accessing a fault report from a centralized service reporting center, establishing a data connection to the computer system reporting the fault, invoking diagnostic routines on the computer system to gather data about the reported fault, analyzing the data, and, if appropriate, clearing the reported fault from the computer system. If the fault cannot be cleared, the expert system recommends maintenance procedures and replacement parts for a technician who the expert system dispatches to the remote computer. The recommendations are based on field experience stored in rules and databases maintained by the expert system. When the remote computer system is controlling a customr switching system (PBX), the expert system only invokes testing procedures in the computer system which do not disrupt stable telephone calls. The expert system access the PBX via the public telephone network.

15 Claims, 24 Drawing Sheets

FIG. 25

SWITCH DATA

CUSTOMER  : XYZ COMPANY  ⎤
RELEASE   : R2V3         | 2501
VINTAGE   : 1.2          ⎦
DUPLICATED: YES          ] 2502
LOCAL TIME: 6:44 AM WEDNESDAY, JANUARY 18, 1989 ] 2503

FIG. 26

ON-LINE PROCESSOR

ON-LINE PROCESSOR HAS 3 ALARM(S).  —2604

FIG. 27

PROC 600 - ALARM CAUSES/ERROR LOG

| UNIT TYPE | MOD | CAB | CAR | SLOT | CKT | ALARM STA | TOTAL FAIL | ENTRY INDEX | STAMP INDEX | DAY | HR | MIN | PROC REF |
|---|---|---|---|---|---|---|---|---|---|---|---|---|---|
| 2 | 0 | 0 | 0 | 20 | 1 | 2 | 3 | 1 | 3 | 18 | 6 | 16 | 10 |
| 68 | 0 | 0 | 3 | 5 | - | 2 | 1 | 2 | 3 | 18 | 3 | 44 | 20 |
| 13 | 2 | 0 | 0 | 7 | - | 2 | 60 | 3 | 3 | 18 | 2 | 49 | 20 |

PROC 610 - TAPE TESTS

| TI | CN | DA | XP | SV | PW | CT | ALM STA | NBR FAIL | IDX | FAULT CODE | DAY | HR | MIN | RUN TAPE | BRD TYPE | BRD VINT | RESOLUTION |
|---|---|---|---|---|---|---|---|---|---|---|---|---|---|---|---|---|---|
| - | - | - | - | - | - | - | 4 | 1 | 1 | 949 | 18 | 6 | 16 | 29 | | | UNCLEARED |
| 1 | - | - | - | - | - | - | 4 | 2 | 1 | 803 | 26 | 9 | 4 | 29 | | | UNCLEARED |
| - | 1 | - | - | - | - | - | 2 | 3 | 1 | 925 | 18 | 6 | 12 | 29 | | | UNCLEARED |

PROC 620 - NETWORK PROCEDURE

| UNIT TYPE | MOD | CAB | CAR | SLOT | CKT | RMA STA | ALARM STA | CKT STA | INIT FL CD | FINAL FL CD | BRD TYPE | BRD VINT | RESOLUTION |
|---|---|---|---|---|---|---|---|---|---|---|---|---|---|
| 68 | 0 | 0 | 3 | 5 | - | - | 2 | 1 | 1856 | - | ANN11E | 2 | UNCLEARED ⊐ 2901 |

THIS DS-1 CIRCUIT REPORTS EXCESSIVE SLIPS.           ⊐ 2902

| 13 | 2 | 0 | 0 | 7 | - | - | 2 | 1 | 407 | - | TN440B | 2 | CLEARED ⊐ 2903 |

FIG. 30

```
                   PROC 612 - INITIALIZATION CAUSES

UNIT FAULT MEMORY ADDRESS                       RELOAD PROCESSOR
TYPE CODE  BLOCK  BLOCK   DAY HOUR MINUTE       COUNT  HEALTH
---- ----- ------ ------- --- ---- ------       ------ --------
  3    8     0    771015   18    6     46          1       0
```

FIG. 31

REMAINING ON-LINE ALARMS

ON-LINE PROCESSOR HAS 2 ALARM(S) REMAINING.

```
                 PROC 600 - ALARM CAUSES/ERROR LOG
UNIT                       ALARM TOTAL ENTRY STAMP             PROC
TYPE MOD CAB CAR SLOT CKT  STA   FAIL  INDEX INDEX DAY HR MIN  REF
---- --- --- --- ---- ---  ----- ----- ----- ----- --- -- ---  ----
  2   0   0   0   20   1     2     3     1     3   18  6  16   10
 68   0   0   3    5   -     2     1     2     3   18  3  44   20
```

FIG. 32

OFF-LINE PROCESSOR

OFF-LINE PROCESSOR HAS NO ALARMS.

FIG. 33

HARDWARE REPLACEMENTS

REPLACE TAPE CARTRIDGE.

FIG. 34

2:793::TAPE CARTRIDGE::
10:407:EXIST:::
14:521:::IF BOARD REPLACEMENTS FAIL, TRY REPLACING THE IOBI-UPCI CABLE:
27:353.1:EXIST:70G (3/4 AMP) FUSE::

FIG. 35

2:940:::2:10000:!UPGRADE TO LATEST SOFTWARE DOT ISSUE.!:!ALARM DISABLED.!
13:407-1:LOCATION:!EXISTING BOARD WITH TN440B V31:2:10000::!EXCESSIVE PARITY ERRORS.!
13:407-2:EXIST::2:10000::! EXCESSIVE PARITY ERRORS.!
16:219:EXIST::5:10000::!IGNORE IF COINCIDES WITH MODULE PROCESSOR FAILURE.!
24:286-1:LOCATION:!EXISTING BOARD WITH SN252 V31:3:10000::
24:286-2:EXIST::3:10000::

FIG. 36

555-555-5555,PBX.592.69,0,0,3,8,1,ON,2,573948,2/2/1989,12:9,283,-,-,ANN17B,5,CLEARED,-
555-555-5555,PBX.592.69,0,1,1,18,1,OFF,2,613440,2/2/1989,0:24,-,-,-,-,UNCLEARED,-
555-555-5555,PBX.592.69,0,1,2,16,4,OFF,2,615671,2/2/1989,23:37,-,-,-,-,UNCLEARED,-
555-555-5555,PBX.1103,11,0,0,0,13,-,ON,1,574404,2/2/1989,12:47,84,-,-,TN445,1,CLEARED,-
555-555-5554,PBX.1296,32,0,2,1,20,1,ON,2,574020,2/2/1989,15,140,140,-,SN230B,1,UNCLEARED,-
555-555-5553,pbx.1310,56,4,0,0,3,-,ON,1,569393,1/29/1989,19:47,639,-,-,TN441,5,UNCLEARED,-

AUTONOMOUS EXPERT SYSTEM FOR DIRECTLY MAINTAINING REMOTE TELEPHONE SWITCHING SYSTEMS

REFERENCE TO A MICROFICHE APPENDIX

This application contains a microfiche appendix, designated A, which lists program instructions incorporated in the disclosed expert system. The total number of microfiche is 2 sheets and the total number of frames is 135.

TECHNICAL FIELD

This invention relates to maintaining computer systems and in particular to maintaining such systems using an expert system.

BACKGROUND OF THE INVENTION

Modern private branch exchanges (PBX) use a computer to control a switching network. PBXs are also referred to as customer switching systems or private automatic branch exchanges (PABX). In addition to controlling the PBX, the computer is continuously running basic diagnostic tests not only on itself but also on the switching network and communication facilities interconnecting the PBX to other PBXs and other types of computer systems. In addition to permanent faults/alarms, these diagnostic tests find many transitory faults within the PBX. The transitory faults may indicate that a component of the PBX is marginally faulty or that the PBX's environmental conditions have induced a failure in the PBX. Such environmental conditions result from a variety of sources ranging from error conditions on the communication facilities to electrical noise in the AC power supplied to the PBX at its site. Each fault occurring on a PBX must be investigated by a service technician to determine the severity of the fault. When a PBX manufacturer has thousands of PBXs to maintain in the field, the cost of making such investigations becomes enormous.

Some manufacturers have equipped their PBXs to report all faults to a centralized service reporting center. A technician at the service reporting center reviews the faults reports and then remotely accesses the PBX to determine the cause of the faults. Whereas the ability of a technician to remotely maintain PBXs is an improvement, the manufacturer still incurs considerable costs in maintaining PBXs in the field because of the labor cost of technicians.

Expert systems have been extensively used to assist in the maintenance of remote systems by directly supporting maintenance technicians. U.S. Pat. No. 4,697,243 discloses an expert system which assists technicians in the maintenance of elevators. In that system, an expert system running on a central computer leads an on-site technician through a diagnostic session with menus, questions, and directions displayed to the technician on a remote terminal. The technician communicates fault and test data to the expert system via the terminal. The expert system then diagnoses the elevator fault and sends the diagnosis back to the technician who then repairs the elevator.

U.S. Pat. No. 4,517,468 discloses an expert system executing on a central computer for collecting data from remote steam turbine generator power plants. After collecting the data from a plant, the expert system determines if a fault condition exists in that plant by using field knowledge incorporated into the expert system. Upon detection of a fault condition, the expert system communicates the information to the plant operator with suggested actions to be taken. However, the expert system does not directly run any tests on the plant or alter the state of data within the plant. Further, the system requires an unique mechanism for accessing the data from the plant since the system cannot use the same means to gather data as used by technicians.

The problem with prior expert systems that diagnose fault conditions in remote computer systems, is that they require a human technician to determine the fault condition or to test and retire fault alarms in those systems. Also those expert systems require special mechanisms for gaining access to remote system data which add to the operating costs.

SUMMARY OF THE INVENTION

A technical advancement is achieved by an expert system that maintains remote computer systems by directly accessing the remote computer systems, diagnosing, and clearing fault conditions on those computer systems. The expert system performs those functions by first accessing a fault report from a centralized service reporting center, establishing a data connection to the computer system reporting the fault, invoking diagnostic routines on the computer system to gather data about the reported fault, analyzing the data, and, if appropriate, clearing the reported fault from the computer system. Advantageously, if the fault cannot be cleared, the expert system recommends maintenance procedures and replacement parts for a technician who the expert system dispatches to the remote computer. The recommendations are based on field experience stored in rules and databases maintained by the expert system. The centralized service reporting center receives faults or alarms directly from the computer systems, and the expert system accesses the reporting center via a digital link.

The expert system accesses the remote computer system in the same manner as a technician by placing a data call through the public telephone switching network. After gaining access to the remote computer system, the expert system invokes test procedures to obtain further data from the computer system and retires alarms representing transitory faults. When the remote computer system is controlling a customer switching system (PBX), the expert system only invokes testing procedures in the computer system which do not disrupt stable telephone calls. In addition, the expert system is capable of maintaining different vintages of the same PBX and identifies the vintage by interrogating each PBX.

In addition, the expert system maintains databases in which the results of previous accesses to any individual PBX are recorded. That information is continuously reused for each access to an individual PBX to diagnose alarms on that system and identify recurrent problems.

These and other features and advantages of the invention will become more apparent from the following description of an illustrative embodiment of the invention considered together with the drawing.

BRIEF DESCRIPTION OF THE DRAWING

FIGS. 25 through 33 provide an example of information displayed by the expert system;

FIG. 34 illustrates a portion of the SINGLE FAILURE database;

FIG. 35 illustrates a portion of the MULTI-FAILURE database; and

FIG. 36 illustrates a portion of the HISTORY database.

DETAILED DESCRIPTION

Figure 1:
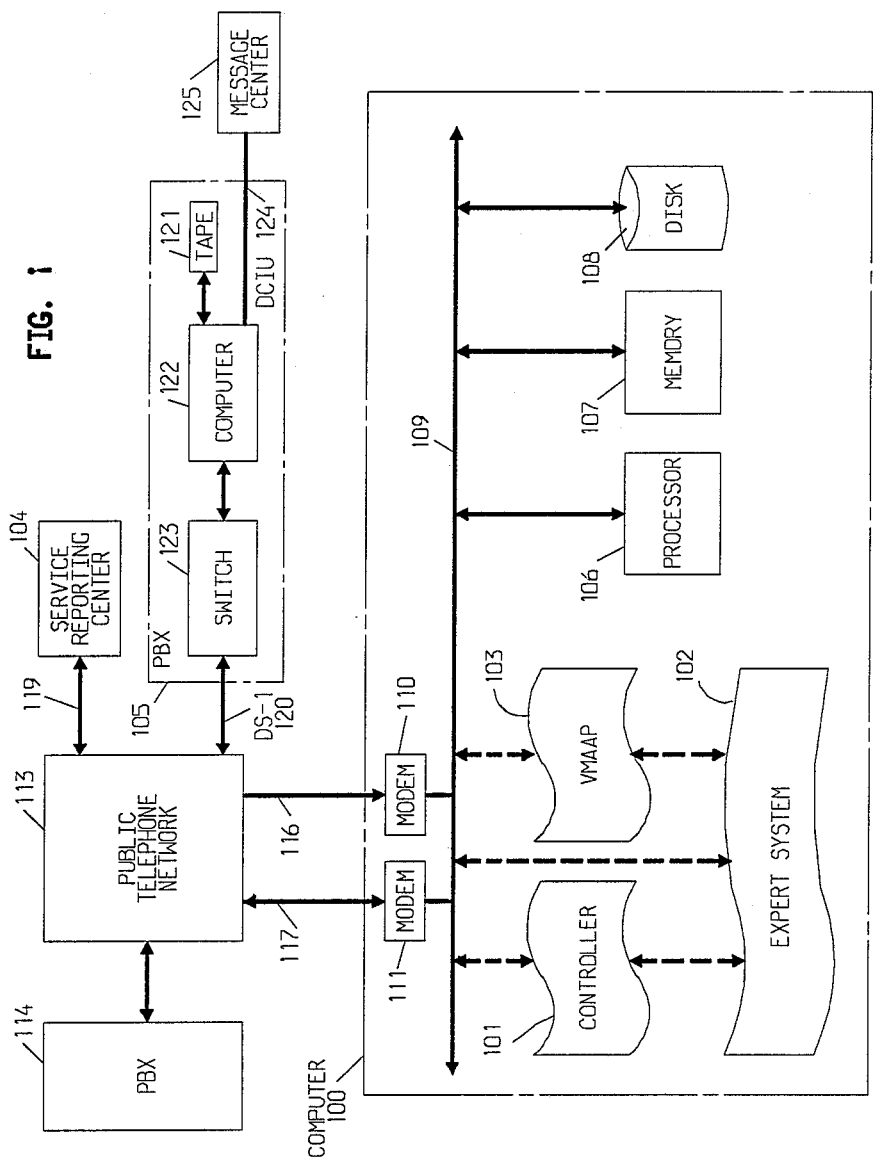
FIG. 1 is a block diagram of a plurality of systems including a computer that executes an expert system embodying the principles of the invention for maintaining the illustrated PBXs.

FIG. 1 illustrates expert system 102 which embodies the principles of the invention for performing maintenance on a plurality of PBXs (105 and 114) via public telephone network 113. Expert system 102 is executing on computer 100 which advantageously may be of the AT&T 6300 family of personal computers. PBX 114 and 105 (also referred to as customer switching systems) are telephone switching systems whose telephone switching network is controlled by a stored program computer. Within each PBX, the computer is constantly executing diagnostic routines checking for fault conditions. For example, within PBX 105, computer 122 is periodically running diagnostic routines to verify not only the state of switch 123 but also the state of the central office trunks such as DS-1 120, digital transmission facility (DCIU) 124 and tape unit 121. If a fault is detected with one of these units, PBX 105 records that fault. Such a fault is commonly referred to as an alarm or an alarm condition and results in a call being placed by PBX 105 via the public telephone network 113 to the service reporting center 104. Upon completion of the call, computer 122 transmits the alarm information to service reporting center 104 where it is recorded. The process of recording alarms by service reporting center 104 is referred to as generating a trouble report or trouble ticket.

Once service reporting center 104 has recorded the trouble ticket in its internal database, then either a human technician or expert system 102 accesses service reporting center 104 to obtain the trouble ticket. Either the technician or expert system 102 accesses PBX 105 via public telephone network 113 to run diagnostic procedures (PROCs) on computer 122 to perform a complete diagnosis of the state of PBX 105. The accessing of PBX 105 for this purpose is referred to as a session. For the AT&T System 85, detailed information on the operation of the PROCs is set forth in the manual entitled, "AT&T System 85, Release 2, Version 4, Maintenance."

After either the technician or expert system 102 has initiated a session with PBX 105, a listing of the alarms found by computer 122 is obtained and then PROCs are run to perform diagnostic tests and gather additional information concerning the nature of the alarms. Many alarms can be resolved through the execution of PROCs and do not require the replacement of any parts within PBX 105. After finishing the session with PBX 105, both the technician and expert system 102 generate a report indicating what alarms, if any, still exist on the system and a recommendation about the desirability of sending a technician to the site. Expert system 102 also recommends what spare parts may be needed to resolve the remaining alarms.

Consider now in greater detail the operations of expert system 102 in maintaining PBX 105. As illustrated in FIG. 1, PBX 105 consists of switch 123, computer 122, tape unit 121, and DCIU 124 which interconnects PBX 105 to message center 125. The remainder of this description uses the following example to illustrate the operation of expert system 102. The example assumes that computer 122 has determined the existence of alarms with respect to computer 122, tape unit 121, and a data transmission facility such as DS-1 120 which are unit-type alarms 13, 2, and 68, respectively. These alarms are illustrated in FIG. 27.

Expert system 102 is constructed using a rule-based methodology. Such a methodology allows expert system 102 to represent units of knowledge in the form of rules which allows easy change of the knowledge represented in each rule without disturbing the rest of the system. A rule-based system consists of three components: working memory, rule memory, and an inference mechanism. The working memory describes the current state of the rule-based system, and moderates all communication between rules. If a rule needs to pass values to another rule, then it must do so through the working memory. The programmer declares items in working memory using a format that is similar to type-declaration information in standard programming languages.

The rule memory is a collection of rules. Each rule consists of a set of conditions and a set of actions. The programmer constructs the rules so that each represents a functionally independent and meaningful portion of the problem solution. In addition, the rule base has access to databases where additional knowledge and PBX specific history information is stored. An example of such databases is in expert system 102, the SINGLE FAILURE and MULTI-FAILURE databases.

In procedural languages, the sequence of program statements and explicit control statements determine execution order. In rule-based programming, the inference mechanism regulates the matching, selection and execution of rules. The inference mechanism is similar to an interpreter executing the following four-step loop:

(1) In the match phase, the inference mechanism collects all rules whose conditions match the current state in working memory.

(2) During the select stage, the inference mechanism selects the rule to be executed. If there is more than one rule that matches the current state, a process called conflict resolution specifies how rule priority is determined.

(3) In the act stage, the actions specified by the selected rule are executed. This results in modifications to the state of working memory.

(4) After the rules actions are executed, the inference mechanism again begins the match stage. This loop continues until no more rules match working memory, or until an explicit halt is encountered.

Expert system 102 is based on the C5 programming language which is similar to OPS5 programming language designed and built by Carnegie-Mellon University. Further details concerning C5 can be found in the article entitled, "Rule-Based Programming in the Unix ® System," G. T. Vesonder, AT&T Technical Journal, Jan.-Feb. 1988, Volume 67, Issue 1. Expert system 105 is illustrated in C5 source language in Microfiche Appendix A.

Expert system 102 not only incorporates engineering and field experience within the rules of the program, but also in databases. In particular, the SINGLE FAILURE and MULTI-FAILURE databases are used to store recommendations on whether to replace parts which have caused alarms within PBX 105. In addition, expert system 102 maintains ADMINISTRATION, HISTORY, and SWITCH databases. The ADMINISTRATION database contains information detailing how the different components are utilized within a PBX. The SWITCH database records information about configuration reported to expert system 102 by each particular PBX with which it has communicated. Finally, the HISTORY database contains a history of the alarms found and action taken for each PBX session. The HISTORY database is used to anticipate serious problems within a particular PBX and to gather additional field experience for later incorporation into the rules (see Microfiche Appendix A) and into the SINGLE FAILURE and MULTI-FAILURE databases.

Expert system 102 is executed by processor 106 in computer 100 as illustrated in FIG. 1. Programs are stored in memory 107 whereas the databases are stored in disk 108. Initially, controller 101 accesses service reporting center 104 via modem 111 and public telephone network 113. From service reporting center 104, controller 101 obtains the trouble ticket information for PBX 105. Expert system 102 then obtains the trouble ticket from controller 101. Expert system 102 then opens a session with PBX 105 by accessing PBX 105 via VMAAP 103, modem 110, and public telephone network 113. As described in greater detail with respect to FIG. 2, expert system 102 now obtains customer data and data concerning the functions of PBX 105. After obtaining this information, expert system 102 requests and obtains from PBX 105 the number of alarms presently existing on the PBX and detailed information about the unit-type and location of each alarm.

For the present example, this information is illustrated in FIG. 27. A unit-type 2 alarm indicates that there is a tape unit problem. A unit-type 68 alarm indicates that there has been an error on a data transmission facility such as DS-1 120, and a unit-type 13 alarm indicates a failure on a port data section of the memory of computer 122. As will be described in greater detail with respect to FIGS. 13 and 14, expert system 102 performs the appropriate PROCs with respect to tape unit 121 and determines that the unit-type 2 alarm cannot be cleared since the trouble/fault still exists on tape unit 121. Then by utilizing the data within SINGLE FAILURE database, expert system 102 recommends that a service technician be dispatched to PBX 105 with a new tape cartridge to replace the existing one. Expert system 102 next analyzes the unit-type 13 and 68 alarms by executing the appropriate PROCs and utilizing the SINGLE FAILURE and MULTI-FAILURE databases. Expert system 102 will successfully cause PBX 105 to recover from these two alarms.

In addition, during each session, expert system 102 performs preventive maintenance with respect to PBX 105 by determining whether computer 122 has undergone any initializations. Based on a examination of these initializations using the HISTORY database, expert system 102 will recommend whether a service technician should be dispatched to PBX 105 to perform specified service procedures which can include the part replacement.

Figure 2:
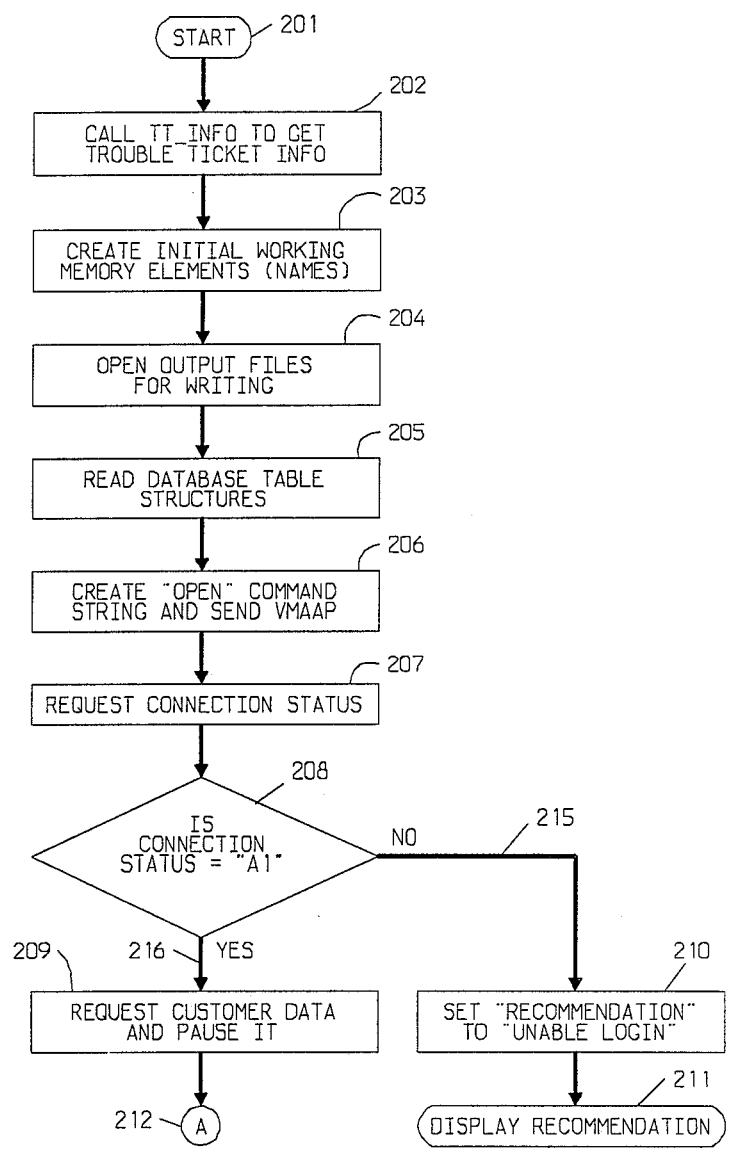
FIGS. 2 through 24 illustrate, in flow diagram form, the logical flow of the expert system of Microfiche Appendix A.

FIG. 2 illustrates the initial setup and logging on to PBX 105 by expert system 102 via VMAAP 103. Initially, expert system 102 obtains information concerning the trouble ticket from controller 101. Upon obtaining this information, expert system 102 creates initial working memory elements using block 203 and opens the necessary output files via block 204. An example of such a working memory element is the switch memory element which contains the information illustrated in FIG. 25 in lines 2501 and 2502. An example of an output file opened by block 204 is one used to store information such as illustrated in FIGS. 25 through 33. Block 205 initiates database table structures.

Using block 206, the expert system 102 instructs VMAAP 103 to place a call to PBX 105 in order to open the session with PBX 105. Block 206 transmits a command to VMAAP 103 which contains the necessary information to identify PBX 105. Expert system 102 waits in block 206 until it receives information back from VMAAP 103 indicating that the connection has been made. Expert system 102 then requests the status of the connection via block 207. Based on the status determined by block 207, decision block 208 determines if a connection has been made. If the connection status is "A1" indicating a successful login to PBX 105, then path 216 is followed to block 209. However, if the status is not "A1", block 210 is executed via path 215. Execution of block 210 indicates that expert system 102 was unable to log on to PBX 105 via VMAAP 103. This information then is displayed via block 211 (see FIG. 22).

If it was possible to log on to PBX 105, expert system 102 requests, in block 209, the customer data from PBX 105 via VMAAP 103. Upon receiving the customer data, block 209 parses this data so that it is in a usable form.

Figure 3:
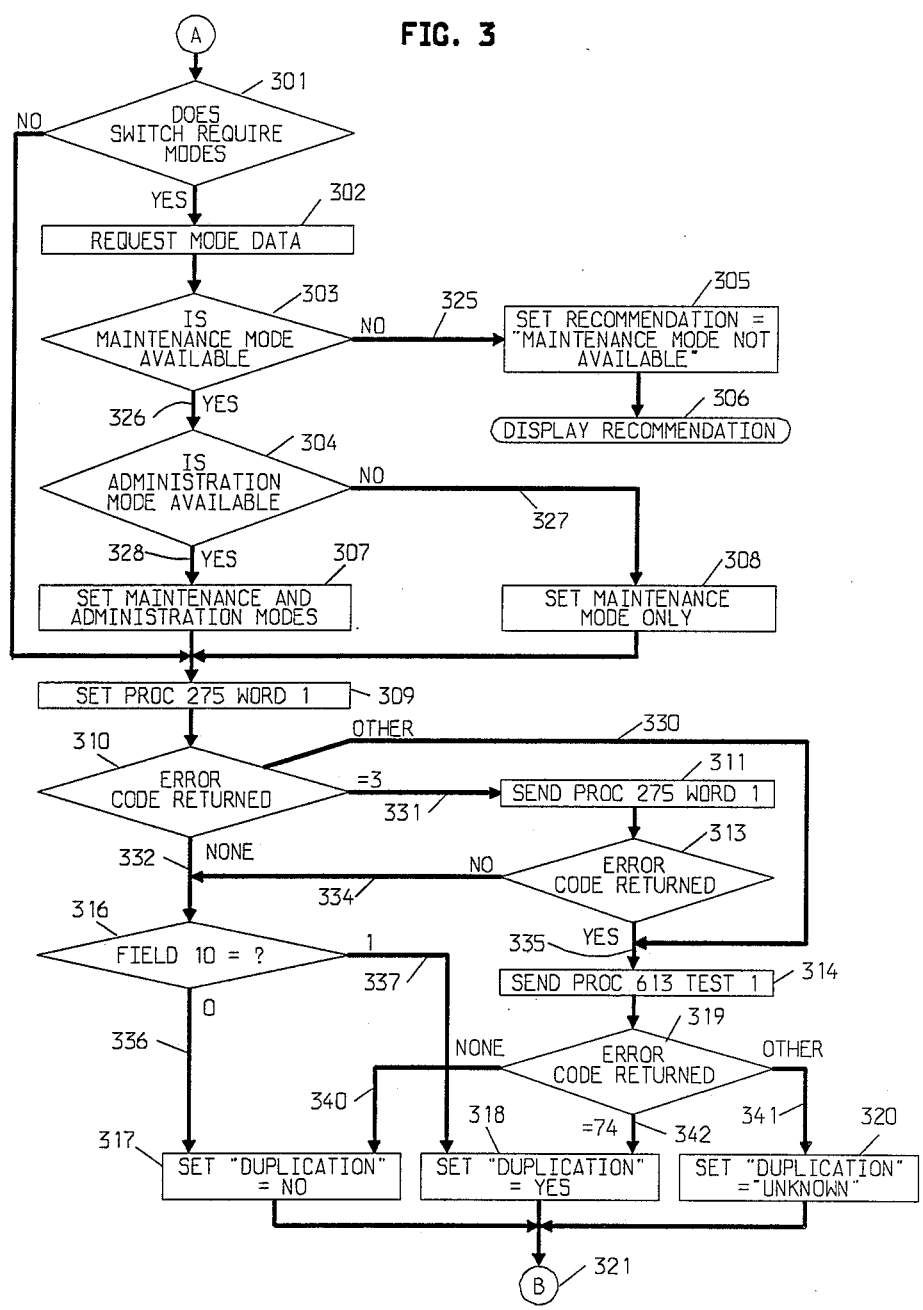

Next, expert system 105 determines the available modes of operation and switch parameters of PBX 105. This is accomplished in FIG. 3. Blocks 301 through 307 determine what modes are implemented and available. The modes include the administration, maintenance, and tape modes. The modes are required in order to avoid interaction problems with other entities that may also be doing work on the PBX, such as an on-site craftsperson. The administration mode allows administration of the different characteristics of the PBX such as which telephone numbers are assigned to which physical ports. The maintenance mode allows the different maintenance procedures to be executed. The tape mode allows the administration data stored on-line in the PBX's memory to be transferred to tape unit 121.

The first decision that must be made is whether the PBX 105 is of a version that requires the modes. This is done by block 301. Certain earlier versions of PBX 105 did not have modes since only one entity at a time could access the PBX. If the decision is made in decision block 301 that the PBX under test does have modes, block 302 requests the data on which modes are available. Next, block 303 checks if the maintenance mode is available. If the maintenance mode is not available, path 325 is followed to block 305 where the recommendation is set so that the message "maintenance mode not available" is displayed during the display recommendation portion of the session by block 211. If the maintenance mode is not available, expert system 102 must stop the session with PBX 105 at this point since it cannot proceed without itself setting the maintenance mode. If the maintenance mode is available, decision block 303 via path 326 checks whether the administration mode is available. If the administration mode is available, then block 307 via path 328 sets both the administration and maintenance modes. If the administration mode is not available, path 327 is followed from decision block 304 to block 308 which sets the maintenance mode only. If the administration mode is not available, the session does not stop since expert system 102 can perform limited maintenance functions without the administration mode.

Blocks 310 through 321 determine whether computer 105 in PBX 105 is duplicated, e.g., has two processors. One processor is online and the other one is offline waiting to be brought online if the current online processor fails. If PBX 105 has duplicated processors, it is necessary to test both of them. Two Procedures (PROCs) perform the duplication testing. These PROCs are detailed in the aforementioned AT&T Maintenance Manual. First, PROC 275 is executed by block 309. Decision block 310 checks the information returned by PBX 105 in response to PROC 275. If no error code is returned by PBX 105, path 332 is followed to decision block 316. If an error code of "3" is returned, expert system 102 determines that an error may have occurred, and block 311 once again executes PROC 275 in PBX 105. Decision block 313 checks the results of the execution of block 311; and if no error code is returned, path 334 is followed to decision block 316. If decision block 310 finds an error code other than "3" or if decision block 313 finds any error code, paths 330 or 335, respectively, are followed from these decision blocks to block 314. Block 314 executes PROC 613. The results of the execution of PROC 613 are checked by decision block 319. If no error code is returned, path 340 is followed to block 318 since this indicates that PROC 613 has determined that computer 122 is duplicated. If error code 74 is returned, path 342 is followed to block 317 since this indicates that PROC 613 has determined that computer 122 is not duplicated. If any other error code is returned, path 341 is followed to block 320 which indicates that the state of duplication is unknown.

If no error code was returned from the execution of PROC 275 in block 309, then path 332 is followed from decision block 310. Decision block 310 examines field 10 of the information returned by PBX 105 in response to PROC 275. This field indicates whether computer 122 is duplicated. If computer 122 is not duplicated, then block 317 marks it as such. If PROC 275 indicates that the processor is duplicated, block 318 marks the system as having a duplicated processor.

The information displayed in lines 2501 of FIG. 25 was obtained in block 209. Blocks 309 through 321 obtained line 2502.

Figure 4:
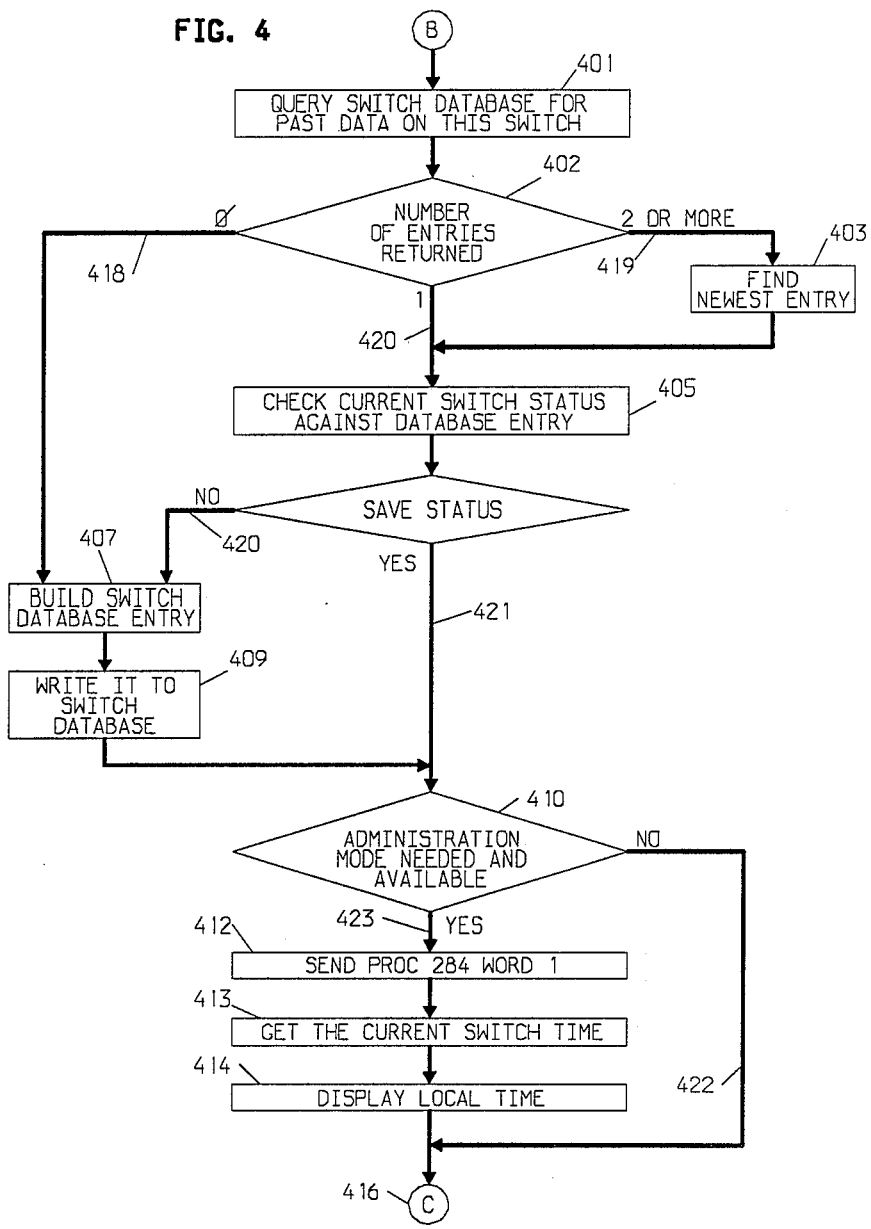

FIG. 4 illustrates the additional administrative tasks that are performed before the testing of PBX 105 can commence. Blocks 401 through 409 check the SWITCH database to determine whether PBX 105 has had maintenance performed on it in the past by expert system 102. First, block 401 queries the SWITCH database to determine if it contains any data with respect to the PBX under test. Decision block 402 then determines the number of entries. If the PBX has not previously been encountered before, path 418 is followed to blocks 407 and 409 which build an entry in the SWITCH database for this PBX. If paths 419 or 420 are followed, the switch has previously had maintenance performed on it. However, what must still be determined is whether the PBX's configuration has changed; and if it has changed what the newest configuration is.

Path 420 is taken if the PBX has only one recorded configuration. If path 419 is followed indicating the existence of more than one past configurations, then it is necessary to determine the newest entry which defines the latest configuration that expert system 102 has encountered with respect to PBX 105. After this has been determined, block 405 is executed which determines (on the basis of the information received and, as shown in FIG. 25 in lines 2501 and 2502) whether the present configuration of PBX 105 represents a change from its last recorded configuration. If there has been a change, block 407 via path 420 creates a new database entry for this PBX. If there has not been a change, path 421 is followed to decision block 410.

Blocks 410 to 413 are concerned with obtaining the local time maintained by PBX 105. The local time is important since PBX 105 may be located anywhere in the world, and the PBX alarms which will be discussed later are time-stamped relative to this local time. If decision block 410 determines that the administration mode has been set by expert system 102, path 423 is followed to blocks 412 and 413 which obtain the local time from PBX 105. Block 414 then displays the local time as indicated in line 2503 of FIG. 25. If the administration mode is not available, path 422 is followed to connector 416.

Having obtained the information defining the system parameters of PBX 105, expert system 102 now obtains an overall view of the maintenance condition of PBX 105 by execution of PROC 600. Execution of PROC 600 on PBX 105 obtains the number of alarms on the PBX and then requests are made for detailed information about each alarm. Block 501 transmits the PROC 600 request to PBX 105 via VMAAP 103. PBX 105 responds to this request with the number of alarms which are outstanding within the PBX. This number is read by block 502, and decision block 503 makes a determination of whether any alarms exist on PBX 105. If no alarms exist, path 522 is followed to block 506 which proceeds to check the off line processor, if any, for alarms.

If alarms exist, then path 523 is followed to block 504 which displays lines 2701 of FIG. 27. Expert system 102 obtains information concerning each of these alarms by the repetitive transmission of the "next circuit" command of PROC 600 by block 507. As information about each alarm is received, it is displayed by block 508 to create each line in lines 2702 of FIG. 27. Warning alarms and the trunk software alarms identified by decision blocks 510 and 512, respectively, are immediately cleared by block 511 via paths 524 and 527, respectively. The sequence of block 504 through 512 is terminated by decision block 514 after information on all the alarms has been obtained. As long as there is still an outstanding alarm, path 530 is followed back to block 507. After information about all alarms has been obtained from PBX 105, path 531 is followed to decision block 515. Blocks 515 through 518 account for the fact that DCIU 124 and tape unit 121 within PBX 105 can each have multiple alarms. Since the diagnostic tests performed for these units are complete, it is desirable only to perform each test once per session. Hence, blocks 515 through 518 remove all but at most one alarm for DCIU 124 and tape unit 121.

There are three overall goals that must be achieved in the execution of each of the diagnostic PROCs. First, expert system 102 determines the failures that caused each alarm by executing diagnostic routines on PBX 105. Secondly, expert system 102 generates a report detailing the results of the diagnostic routines and indicating the remaining alarms on the system. Finally, expert system 102 provides recommendations for replacing hardware on PBX 105 if necessary. An example of such a recommendation is illustrated in FIG. 33 where it is recommended to replace the tape cartridge of PBX 105.

Figure 5:
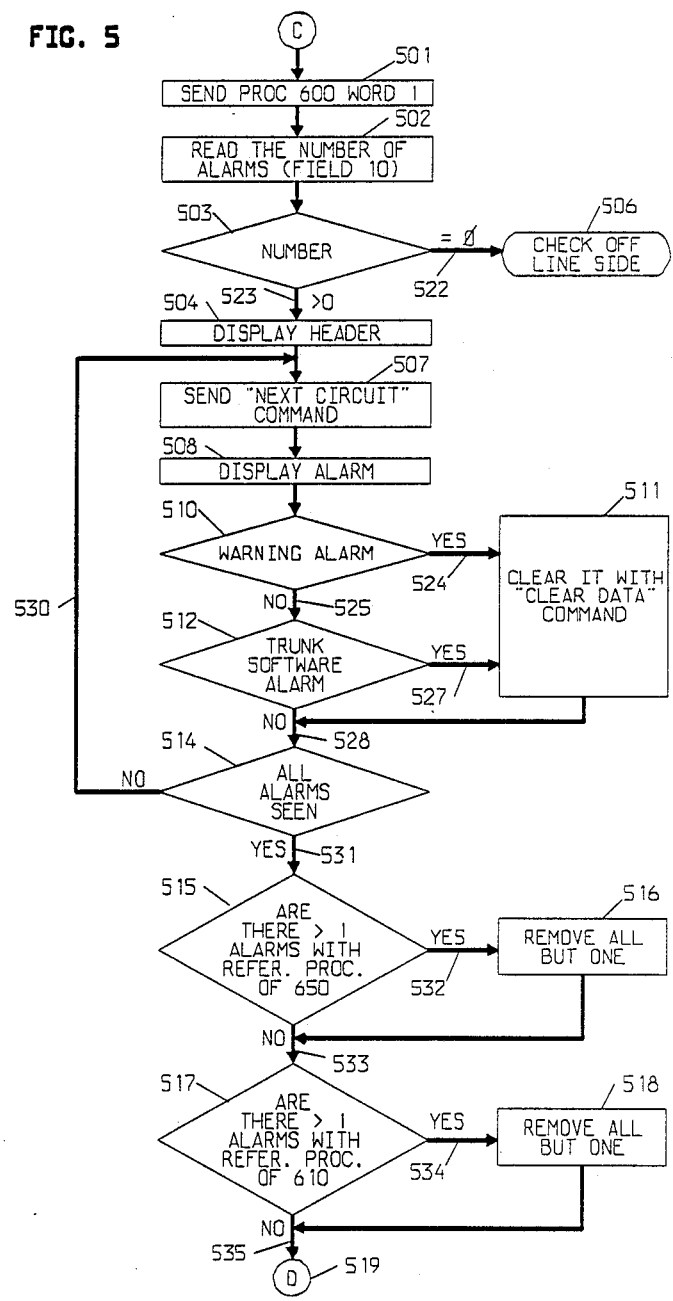
Figure 6:
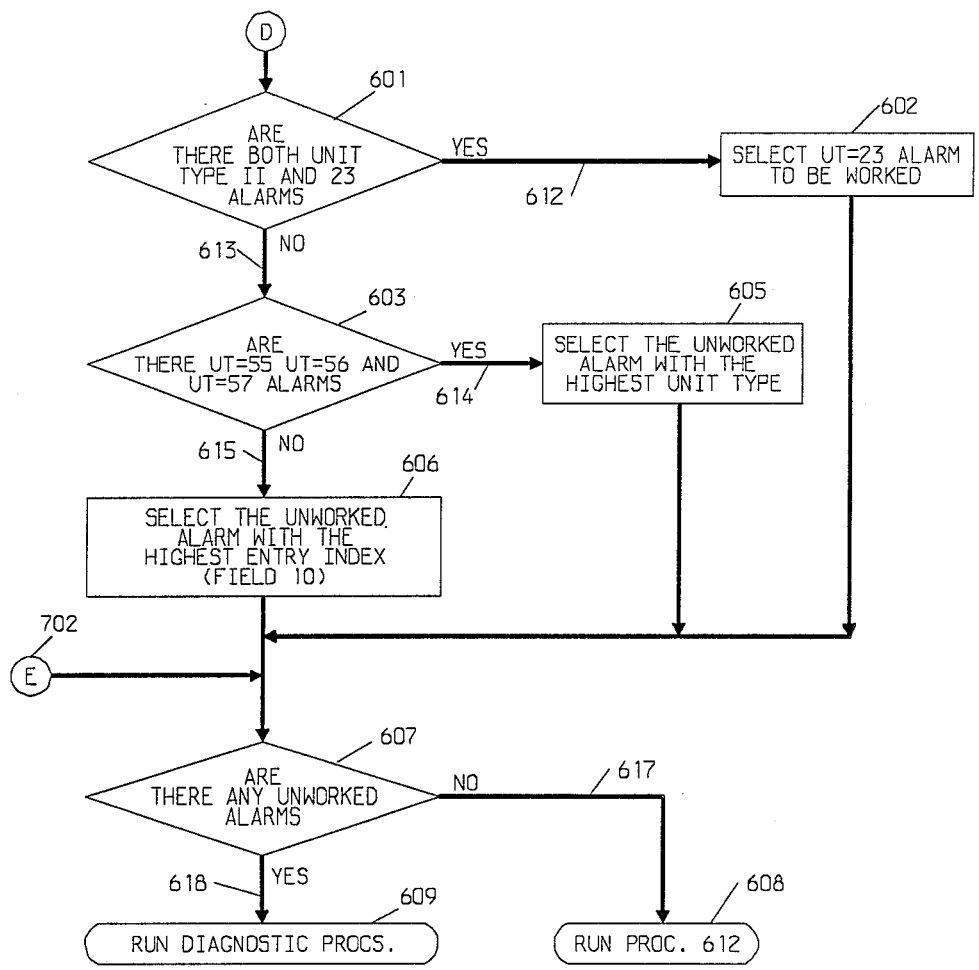

FIG. 6 is concerned with the order in which the alarms obtained in FIG. 5 should be processed. The aforementioned AT&T Maintenance Manual indicates that the alarms should be processed in the order in which they are received upon execution of PROC 600. This order is given by the entry index number as illustrated in FIG. 27. However, field knowledge obtained and incorporated into expert system 102 indicates that if both unit-type 11 and 23 alarms are encountered, then the alarm with a unit type of 23 should be processed first. Decision block 601 and block 602 accomplish this. Similarly, experience has shown that if unit-type 55, 56 and 57 alarms are present together, then the alarms should be processed in descending order by unit type (i.e. 57 then 56 then 55). This is accomplished by blocks 603 and 605. Otherwise, if none of these special cases are encountered, block 606 simply chooses the unprocessed alarm with the highest index number.

Decision block 607 results in the execution of the diagnostic PROCs detailed in FIGS. 7, 9, 11, 12, 13, and 15. It is important to remember expert system 103, whose overall logical flow is illustrated in FIGS. 2 through 24 is implemented in a rule-based language (see Microfiche Appendix A.) For more complete details on how each diagnostic routine is implemented, the code starting at page 36 and entitled, "Referred PROCs" in Microfiche Appendix A should be examined.

The following is a description of the operation of each of these PROCs. Note that in our present example alarm information received from PBX 105 as illustrated in FIG. 27 indicates the existence of alarms of unit-types 2, 68, and 13. Unit-type 2 alarms indicate a problem with the tape unit. Unit-type 68 alarms indicate that there has been an error on a data transmission facility such as DS-1 120. Unit-type 13 alarms indicate a failure in the port data section of the memory of computer 122. However for unit-type 13 alarms, field experience incorporated into expert system 102 has shown that a variety of different equipment failures within PBX 105 may result in that type of alarm. Those failures will be further detailed during the discussion of unit-type alarm 13.

Figure 13:
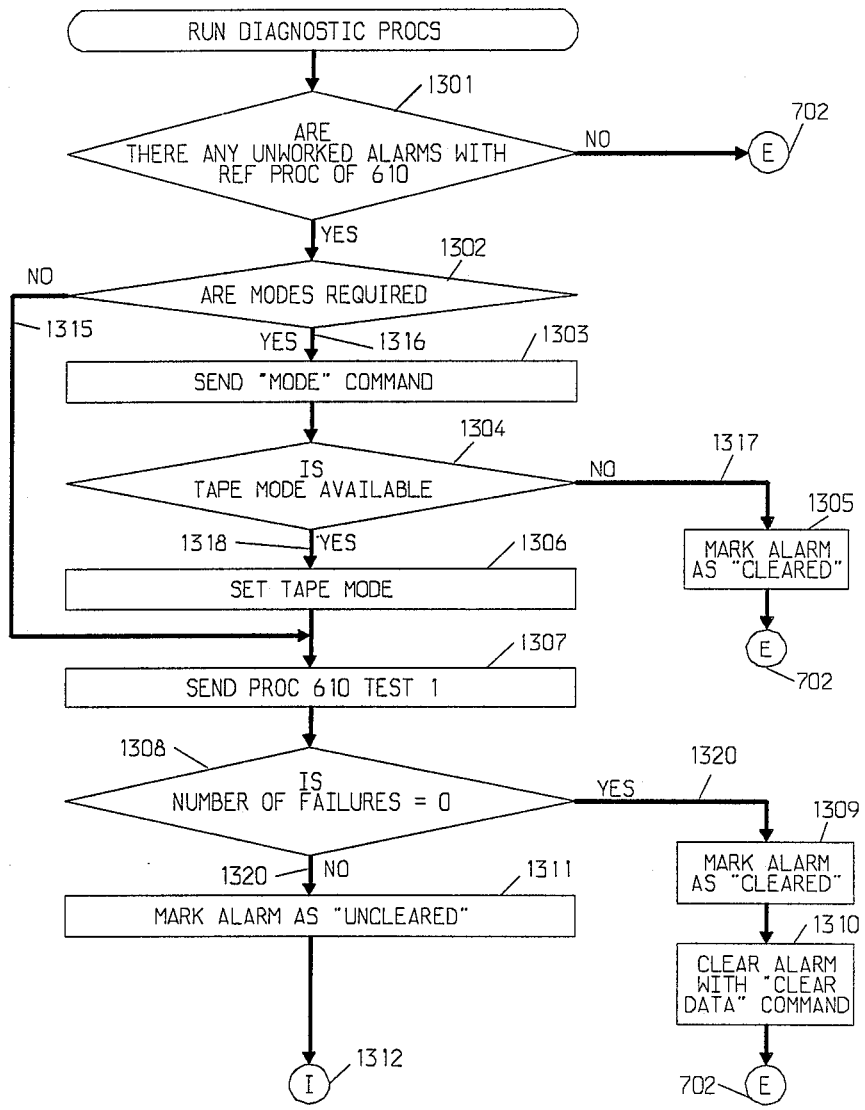

FIG. 13 shows the logical operations performed by expert system 102 in response to a unit-type 2 alarm. This alarm indicates that an error has been encountered on tape unit 121. Decision block 1301 represents the logical select stage of rule-based expert system 103 for a unit-type alarm 2.

Logical blocks 1302 through 1306 are concerned with versions of PBX 105 which require modes. If PBX 105 is of a non-mode version, then path 1315 is followed to block 1307. If modes are required, then blocks 1303 and 1304 determine whether the tape mode is available to expert system 102. If the tape mode is not available, path 1317 is followed from decision block 1304 to block 1305 which marks the alarm as "uncleared." Marking the alarm as uncleared causes a message indicating that fact to be printed. If the tape mode is available, then block 1306 is executed via path 1318 to set the tape mode.

Figure 14:
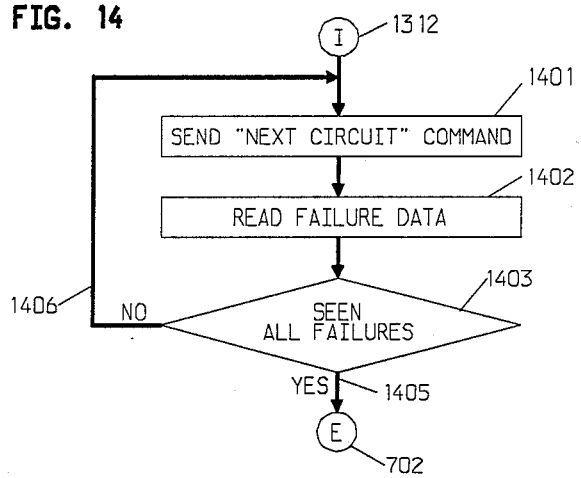

Because of the nature of tape unit 121, failure status information only is collected from this unit and no diagnostic tests are actually run on it. However, as will be illustrated later, a recommendation may be made to replace the tape cartridge. In response to the execution of PROC 610, decision block 1308 determines whether tape unit failures have occurred. If no tape unit failures are outstanding, blocks 1309 and 1310 are executed via path 1320. These blocks note that the alarm has been cleared, and a command is sent to PBX 105 to clear the indication in the PBX. In FIG. 14, blocks 1401 through 1403 collect all the failures associated with the unit-type alarm 2 on PBX 105.

Figure 7:
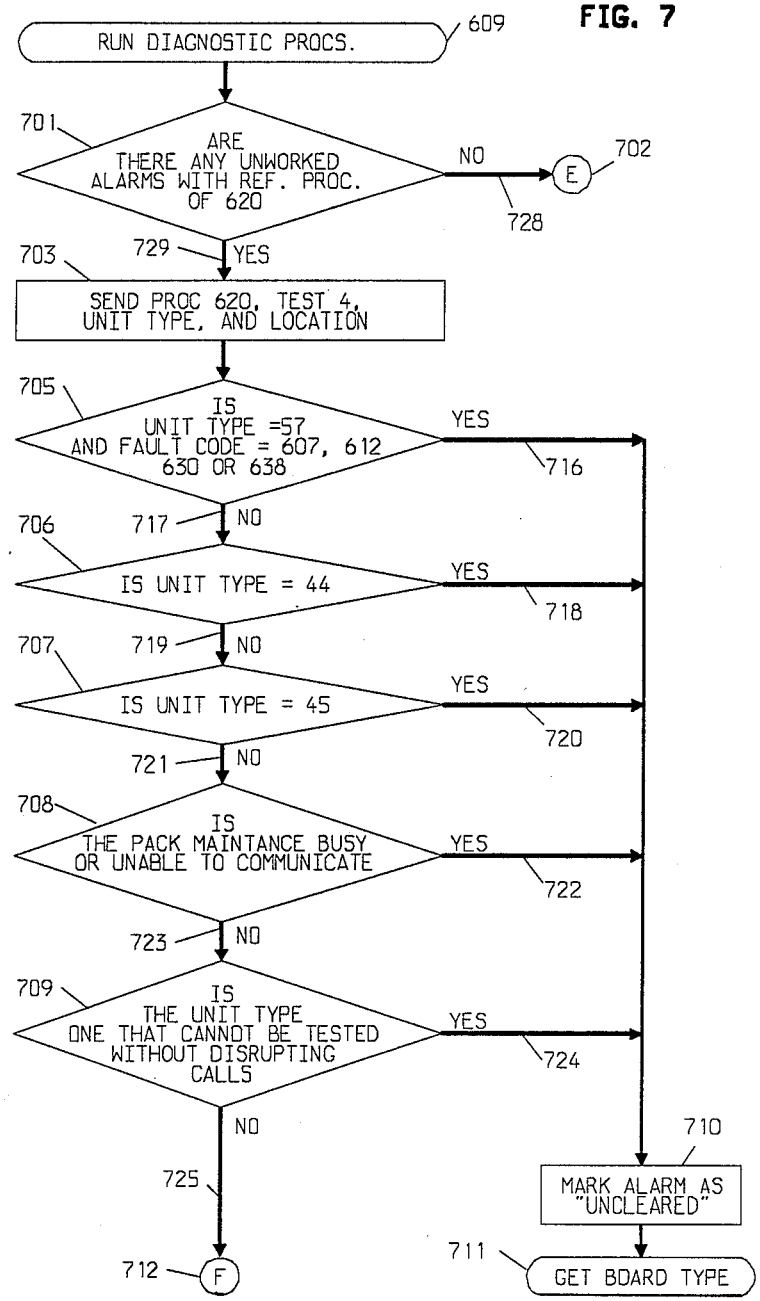

FIG. 7 illustrates the logical flow performed in utilizing PROC 620 to determine the cause of a network alarm. First, logical decision block 701 ascertains whether there are any such alarms. If there is an outstanding network alarm, then control is passed to block 703 via path 729. Block 703 first obtains the unit-type and location of the failing network unit by execution of PROC 620. Decision blocks 705 through 709 check whether there are special cases which make it undesirable to execute the diagnostic portion of PROC 620. Decision block 705 determines whether there are intermodule calls that could be dropped if the diagnostic portion of PROC 620 is executed. If intermodule calls could be dropped, control is transferred to block 710 via path 716. Decision block 706 checks whether the failing network unit is the attendant console interface (unit-type 44). If the attendant console interface is failing, this test cannot be performed since to properly perform the test, the attendant console headset must be unplugged which requires a craftsperson on site. If the unit failing is unit-type 44, path 718 is followed to block 710; if not, path 719 is followed to decision block 707. The latter decision block checks whether the alarm is of unit-type 45 which indicates an anxiliary trunk circuit pack. In order to test that circuit pack, the DIP switches must be set to a particular setting which is impossible to verify remotely. If the alarm is of unit-type 45, path 720 is followed to block 710, otherwise path 721 is followed to decision block 708.

Decision block 708 determines whether the failing circuit pack has been marked as "maintenance busy" indicating that there is a craftsperson on site performing maintenance tests on this particular circuit pack. If the circuit pack is marked as maintenance busy, path 722 is followed to block 710; otherwise, path 723 is followed to decision block 709. Decision block 709 checks a number of special situations where stable calls could be dropped/disconnected if the diagnostic portion of PROC 620 is executed. If stable calls could be dropped, path 724 is followed to block 710 since it is undesirable to perform a test that could potentially drop calls. If the testing would cause no stable calls to be dropped, path 725 is followed to connector 712. Block 710 marks the alarm as "uncleared," which terminates the session. Connector 711 interconnects to a portion of the program which obtains the board type. This portion is executed so that the board can be checked to insure that it is of the proper vintage and is properly administered.

Figure 8:
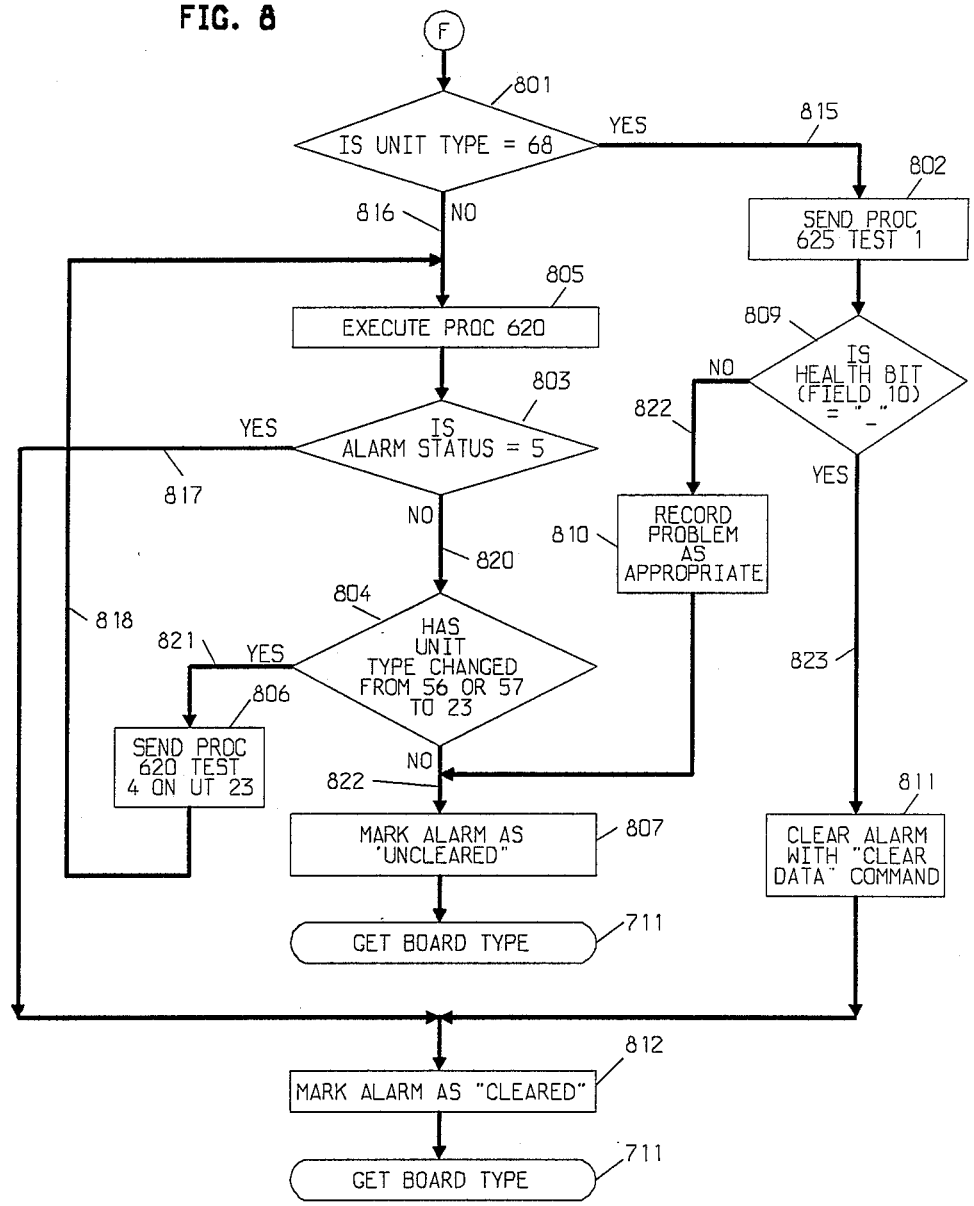

FIG. 8 illustrates another special case where the diagnostic portion of PROC 620 often cannot be run. Unit-type 68 alarms indicate a failing DS-1 trunk unit such as unit 120 which has 23 separate channels, each capable of carrying a telephone conversation. Since the probability is extremely high that at least one of these channels will be active at any given point in time, a non-invasive PROC (PROC 625) is used to investigate the status of this particular facility. Decision block 801 checks if the failing facility is of unit-type 68; and if it is, path 815 is followed to block 802. Blocks 802 through 811 utilize PROC 625 to check the status of the failing DS-1 trunk unit. If the failing facility is not of unit-type 68, then path 816 is followed to block 805 which executes the diagnostic portion of PROC 620.

After execution of the diagnostic portion of PROC 620, decision block 803 checks if the alarm status after execution of block 805 indicates that the alarm had been cleared. If the alarm has been cleared, path 817 is followed to block 812. If the alarm has not been cleared, path 820 is followed to decision block 804. Decision block 804 checks whether the alarm after execution of PROC 620 has changed from a unit-type 56 or 57 alarm (intramodule data store or light guide interface fault) to unit-type 23 alarm (duplication channel fault.) If this change has occurred, field experience has found that the unit-type 23 alarm must first be cleared before any other alarms can be processed. The unit-type 23 alarm is cleared by following path 821 to decision block 806 which via path 818 re-executes PROC 620 on the duplication channel via block 805.

If there has not been a change in the unit-type of the alarm, decision block 804 transfers control to block 807 via path 822. Block 807 marks the alarm as "uncleared" and transfers control to connector 711 to obtain the board type. This is done so that a replacement recommendation can be made.

After execution of PROC 625 by block 802, decision block 809 is executed to determine whether the test indicated that the DS-1 trunk facility is failing. If the facility indicates no failures, then block 811 is executed to clear the alarm in PBX 105 via path 823. If the facility indicates a problem, path 822 is followed to block 810 which records the problem. The information recorded in block 810 is utilized to print the information of FIG. 29, line 2902.

In the present example, FIG. 27 illustrates the results of executing PROC 600 to obtain the initial alarms of PBX 105. The third line of block 2702 indicates that there is another failure (unit-type 13 alarm, port data storage unit) which requires the execution of PROC 620. When PROC 620 is executed to investigate this particular alarm at decision block 805, path 816 is followed to block 803 which checks the result. Then, since the port data unit in the present example shows no failures, control follows path 817 to block 812. Block 812 marks this alarm as "cleared" and transfers control to the "get board-type" procedures via connector 711. Therefore, the results of executing PROC 620 as displayed in line 2903 of FIG. 29 indicate that the unit-type 13 alarm has been cleared.

Figure 9:
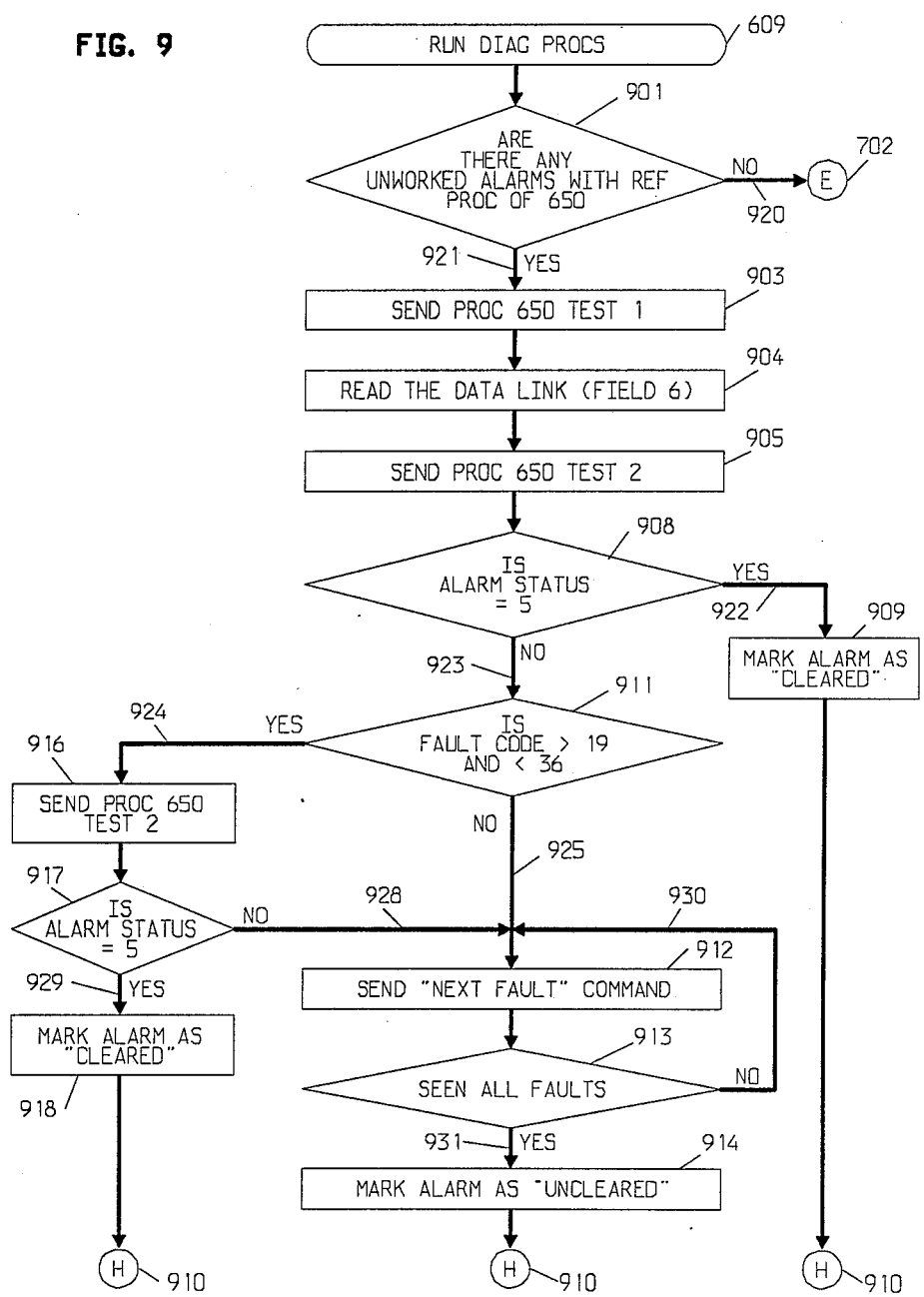

FIG. 9 illustrates the logical flow for PROC 650. This PROC is used to test DCIU 124 of PBX 105. This data transmission facility has eight distinct data links. Each data link interconnects PBX 105 to a computer or communications systems. Examples of such systems are voice mail and message center systems. PBX 105 is connected only to message center 125. First, PROC 650 (test 1) is utilized to determine which of these data links is failing. This information is read from PBX 105 utilizing block 904. Block 905 is then utilized to execute the diagnostic portion of PROC 650 (test 2) to perform transmission testing on that data link. Decision block 908 then checks if the results of the diagnostic portion of PROC 650 indicate that the transmission test was successful. If so, then blocks 909 and 910 are executed via path 922. If the transmission test failed, path 923 is followed to decision block 911. The latter decision block determines if the fault code returned by the execution of the diagnostic portion of PROC 650 is between 19 and 36. If the returned code is in that range, then field experience has shown that PROC 650 should be re-executed since those alarms may clear themselves. This is performed by following path 924 to block 916. If the returned fault code is not in that range, path 925 is followed to block 912. After re-execution of PROC 650 in block 916, decision block 917 determines whether the alarm has been cleared on the second pass. If the alarm has been cleared, path 929 is followed to block 918 which performs a function similar to that performed by block 909. If the alarm has not been cleared, decision block 917 transfers control via path 928 to block 912. This latter block in conjunction with decision block 913 utilizes the "next fault" command of PROC 650 to obtain all of the outstanding fault information. Once all the fault information has been collected, path 931 is followed to block 914 which marks the alarm as "uncleared" and transfers to connector 910.

Figure 10:
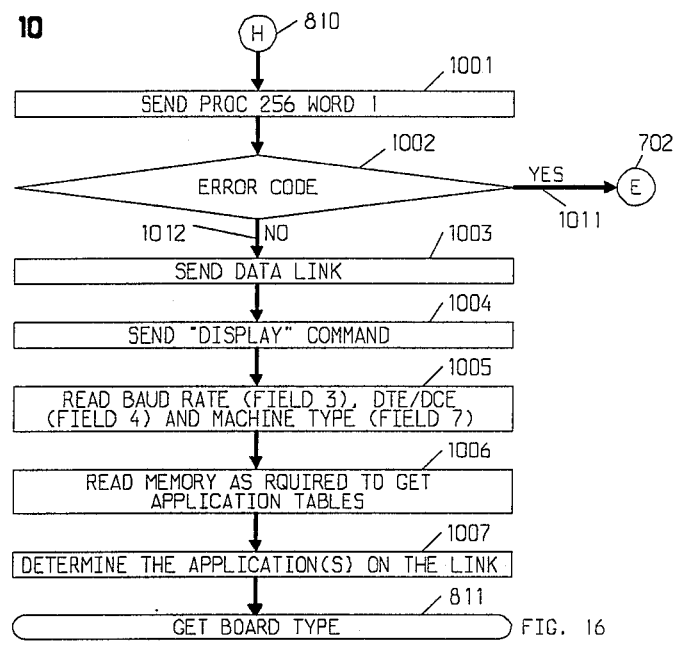

FIG. 10 is a continuation of FIG. 9. Blocks 1001 through 1007 obtain information to make up a report similar to FIG. 28. Block 1001 is used to execute PROC 256 to determine additional information about the data link. Decision block 1002 determines whether an error has occurred during the execution of PROC 256. If there is an error, path 1011 is followed to connector 702 which results in error processing as illustrated in FIG. 7. If an error did not occur, path 1012 is followed to block 1003. Block 1003 once again uses PROC 256, but this time specifies the failing data link. Further information about that link is obtained using the display portion of PROC 256 in block 1004. After execution of this block, the specified information is read using block 1005. Then block 1006 reads the translation tables in the memory of PBX 105 to determine the nature of the applications assigned to the logical channels of the indicated data link to PBX 105. For example, the same computer can run applications to function either as a message center or as a telemarketing center. Each application is assigned one or more logical channels on the physical data link between the computer and PBX 105. After executing block 1007, connector 811 transfers control to the procedures that obtain the board type.

Figure 11:
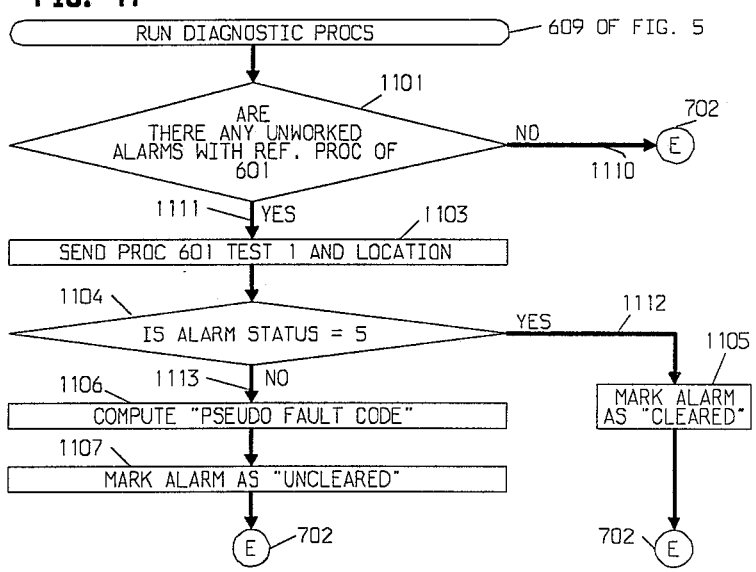

FIG. 11 illustrates the logic flow of PROC 601. This PROC obtains information concerning the units in PBX that control the physical environment, e.g., fans, power supplys, battery back-up units, etc. Decision block 1101 first determines whether this PROC is to be run. If so, path 1111 is followed to block 1103 which executes PROC 601. Decision block 1104 checks if the alarm has been marked clearly by PBX 105. If it has, path 1112 is followed to block 1105 and from there to connector 702. If the alarm is not cleared, path 1113 is followed to block 1106. The latter block takes the information returned from PBX 105 as a result of the execution of PROC 601 and computes a pseudo-fault code that summarizes information concerning the failure that was identified. This pseudo-fault code records the possible multiple causes of the alarm in the history database. After execution of block 1106, block 1107 is executed to mark the alarm as uncleared, and control is passed to connector 702.

Figure 12:
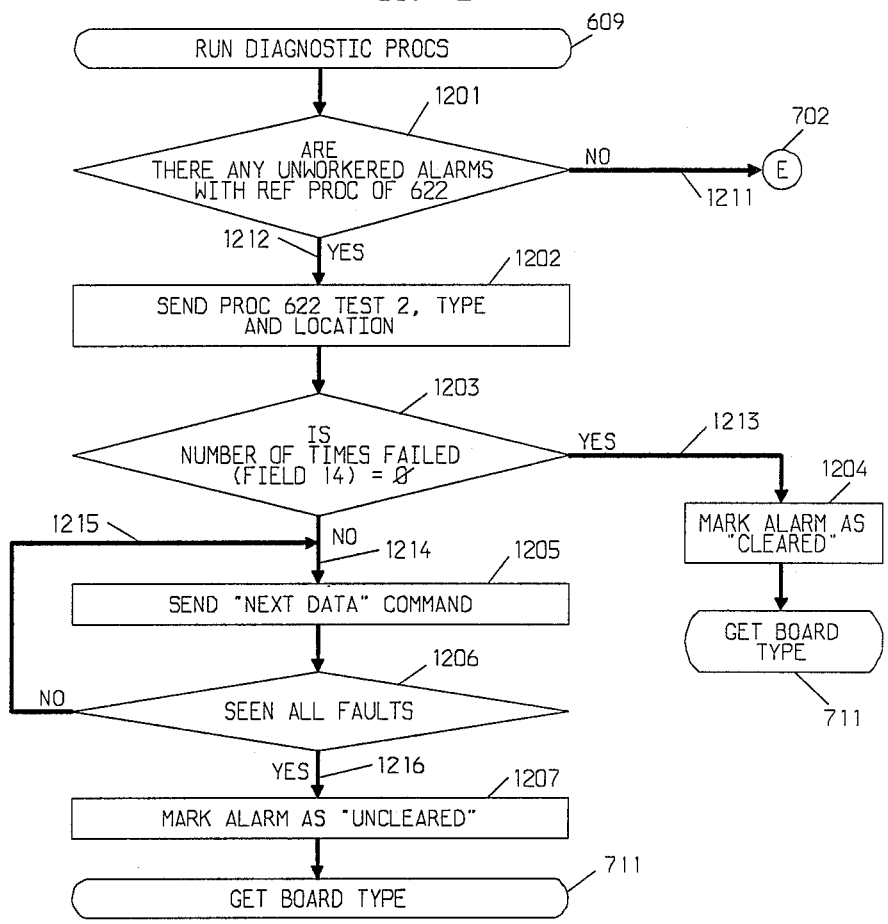

FIG. 12 illustrates the logical flow of PROC 622. This latter PROC tests peripheral equipment attached to PBX 105, such as telephone stations and data terminals. Block 1202 executes the diagnostic portion of PROC 622 after providing the type and location of the failing peripheral equipment. PROC 622 runs the diagnostic portion of the test several times on the failing peripheral unit to fully evaluate the state of the unit. Decision block 1203 determines whether the unit failed under test. If the indicated unit did not fail, path 1213 is followed to block 1204 which marks the alarm as cleared. If the unit failed under test, control is transferred via path 1214 to block 1205. Blocks 1205 and 1206 obtain detailed results of the multiple diagnostic tests performed on the peripheral unit. After all this information has been obtained, path 1216 is followed to block 1207 which marks the alarm as uncleared and control is transferred to connector 711.

Figure 15:
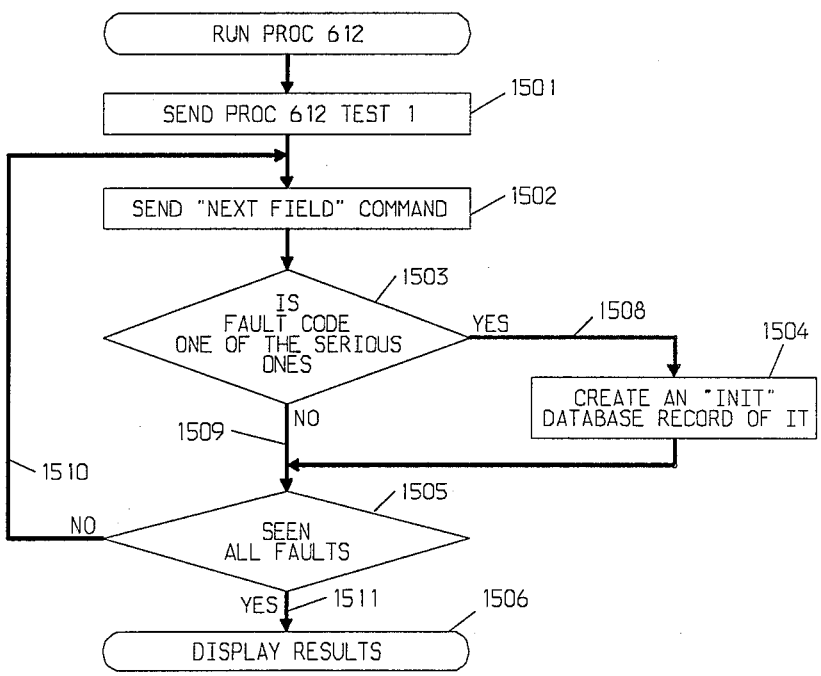

FIG. 15 illustrates the logical flow of PROC 612. This latter PROC is executed every time that expert system 102 contacts a PBX such as PBX 105. PROC 612 interrogates the PBX to determine whether the PBX has undergone any software initializations. For example, software initializations occur if the program executed by PBX 105 is repeatedly interrupted by a parity error or programming problem. The information obtained by PROC 612 is utilized to predict in advance whether a particular PBX is approaching a critical point where it may have a severe service outage. If such a situation is detected, a craftsperson may be dispatched to prevent an actual outage from occurring.

Block 1501 executes PROC 612; and block 1502 obtains information about any initialization causes appearing in the PBX's log. Decision block 1503 looks at the resulting fault codes to determine their seriousness. If a serious fault code is detected, then path 1508 is followed to block 1504. This latter block makes a record to track these conditions in the INIT database maintained by expert system 102. An example of a minor fault is an on-site craftsperson who simply stopped the PBX processor to perform maintenance functions. Decision block 1505 insures that all initialization log entries have been checked. After all entries have been checked, decision block 1505 transfers control via path 1511 to connector 1506.

Figure 16:
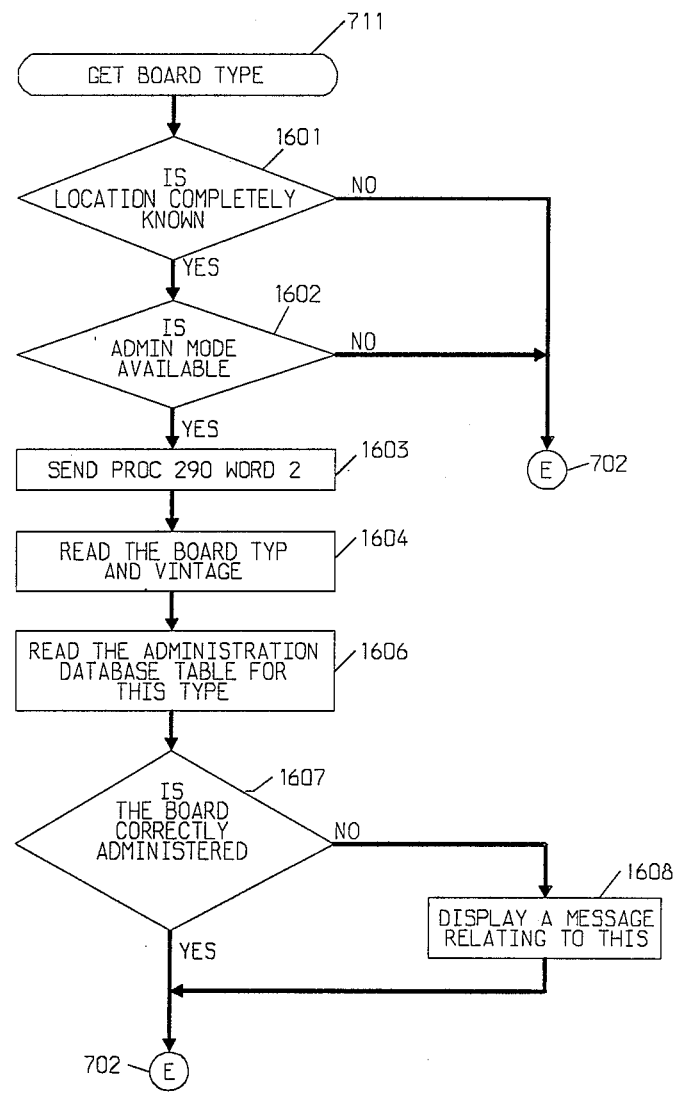

FIG. 16 illustrates the logical flow for obtaining the board or circuit pack type. PROC 600 may provide incomplete information concerning the location of the failing circuit board. Block 1601 determines whether the location of the failing init is completely known. If the location of the failing circuit board is not completely known, control is transferred to connector 702. If the location is known, decision block 1602 is executed to determine whether the administration mode has been set. If the administration mode has not been set, then the board type cannot be determined since this information is stored within PBX 105 and the administration mode is necessary to obtain that information. If the administration mode has been set, then block 1603 is executed. The latter block executes PROC 290 on PBX 105 to obtain the board type and board vintage from the PBX. This information is read by block 1604. Next, the ADMINISTRATION database of expert system 102 is interrogated to ascertain whether the board is correctly administered on PBX 105. The decision of whether the administration is correct is performed in decision block 1607. If the board is incorrectly administered, block 1608 is executed to highlight this fact so that a craftsperson can readminister the board within PBX 105. Lastly, control is passed to connector 702.

Figure 17:
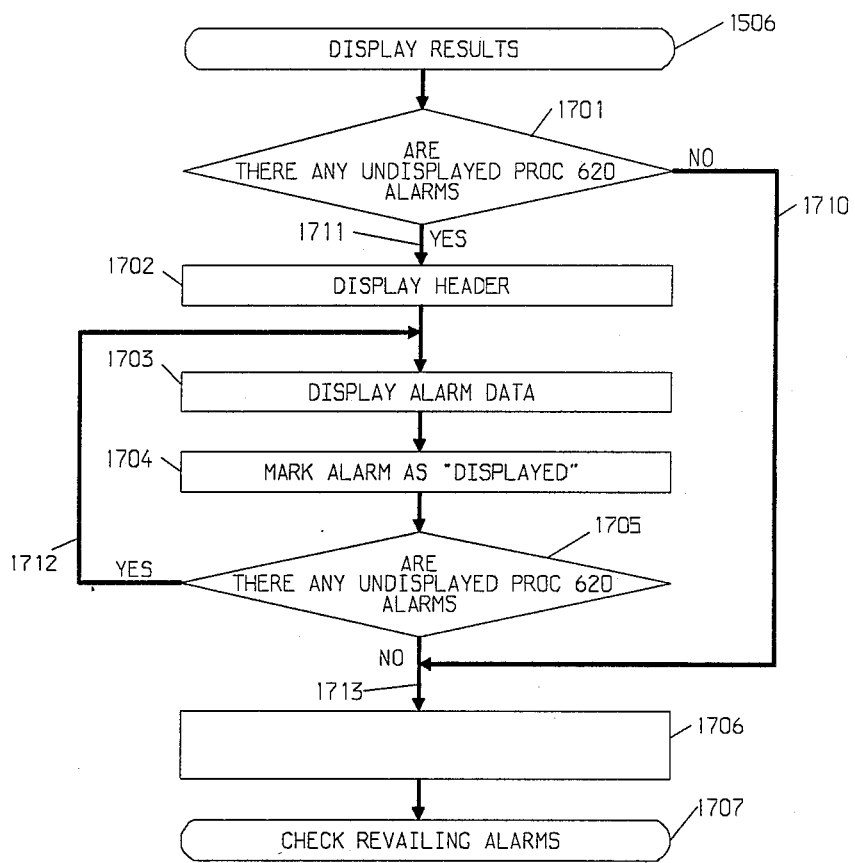

FIG. 17 illustrates the logical flow for printing the information gathered by the diagnostic PROCs for this session with PBX 105. See FIGS. 28 through 30 for an example of this printed information. Blocks 1701 through 1705 illustrate the logical flow for printing the information for PROC 620. Block 1701 determines if there is any information to be displayed for PROC 620. If there is no information to be displayed, path 1710 transfers control to block 1706. If there is information to be displayed, control is transferred to block 1702 via path 1711. The latter block prints the display header and then transfers control to blocks 1703 through 1705. These blocks display the data on 2901 through 2903 of FIG. 29. Similar logical flow as used by blocks 1702 through 1705 is utilized in block 1706 for printing information gathered by the execution of PROCs 650, 601, 622, 610, and 612 provide for PROC 620. After execution of block 1706, control is transferred to connector 1707.

Figure 18:
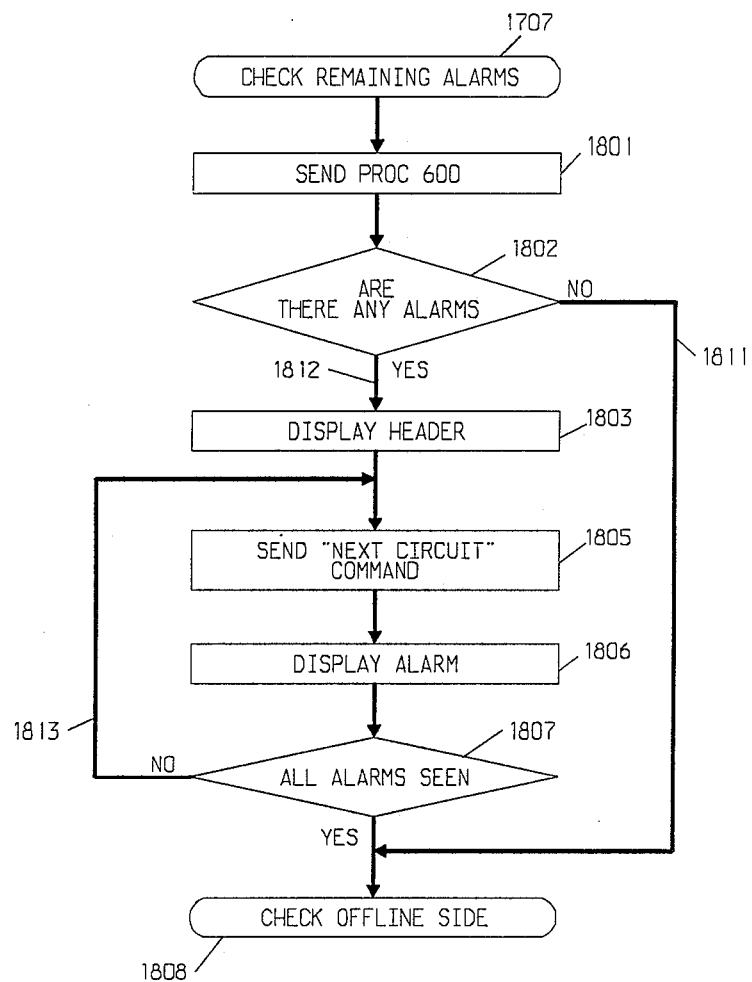

FIG. 18 illustrates a check for remaining alarms and the display of alarm information which, for the present example, results in the generation of FIG. 31. The alarm state of the PBX is again checked to ensure that it is consistent with the text results seen by expert system 102. In the present example, unit-type alarm 13 should be cleared; however, unit-type alarms 2 and 68 should still remain on PBX 105. Block 1801 executes PROC 600 to interrogate PBX 105 regarding alarms existing on that PBX. Decision block 1802 checks if there are any remaining alarms. If there are no remaining alarms, control is passed to connector 1808 via path 1811. If there are remaining alarms, block 1803 is executed via path 1812. This latter block displays the header information illustrated in FIG. 31 for the present example. Blocks 1805 through 1807 then determine what alarms are present on PBX 105 and display this information as illustrated in FIG. 31. After all the alarms have been displayed, control is passed via path 1814 to connector 1808.

Figure 19:
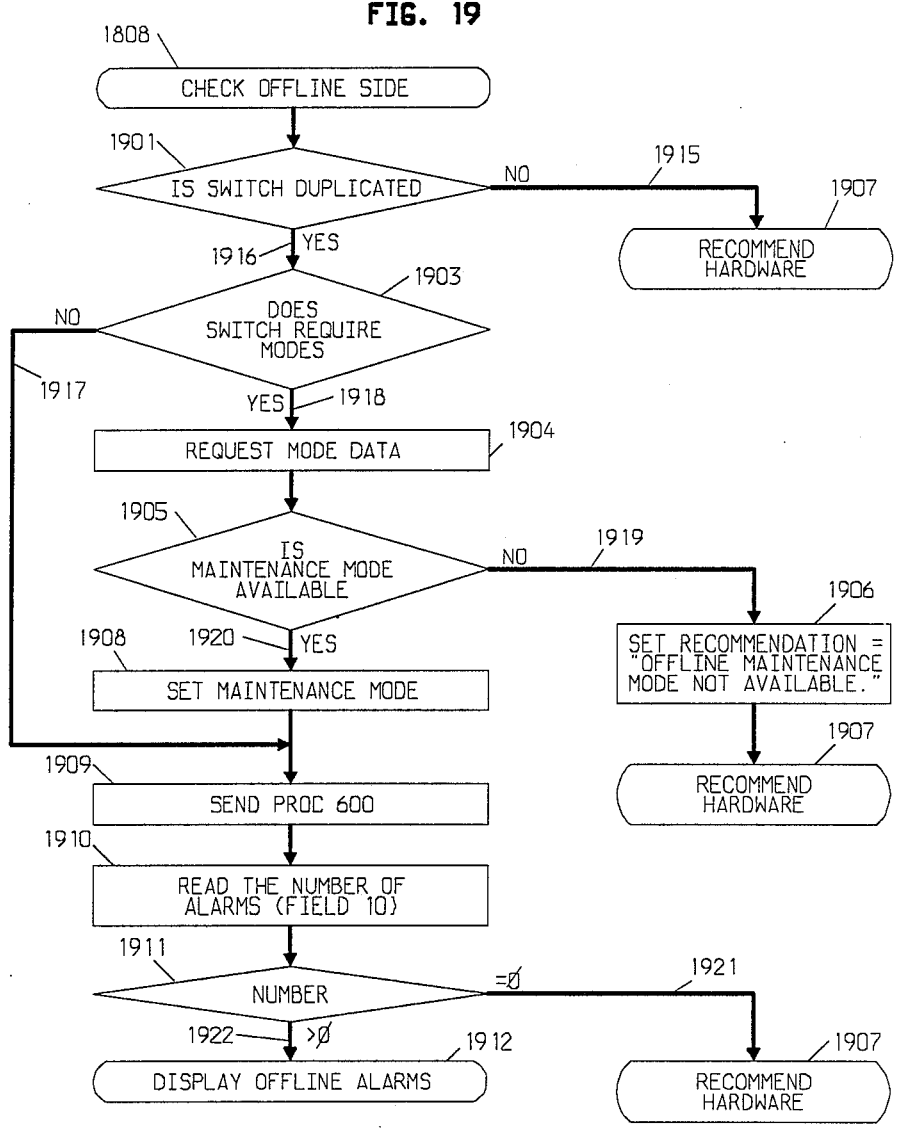

FIG. 19 illustrates the logical flow of checking the off-line processor of PBX 105. First, decision block 1901 checks if computer 122 is duplicated. If it is not, path 1915 is followed to connector 1907 which executes the program segment which recommends which hardware, if any, should be replaced on PBX 105. If computer 122 is duplicated, decision block 1903 is executed via path 1916. Before maintenance, administration, and tape functions can be accessed in this PBX, decision block 1903 checks whether PBX 105 requires mode permission. If modes are not required, path 1917 is followed to block 1909. If modes are required, block 1904 is executed via 1918. Block 1904 requests the mode data from the off-line processor of PBX 105. Note that the mode data for the on-line processor of PBX 105 was previously obtained in FIG. 3. Decision block 1905 checks whether the off-line maintenance mode is available. If the maintenance mode is not available on the off-line processor of PBX 105, then control is transferred via path 1919 to block 1906. This transfer results in the recommendation being set to display the fact that the off-line maintenance mode is not available. Then, control is passed to connector 1907. If decision block 1905 determines that the maintenance mode is available, control is transferred via path 1920 to block 1908 which sets the maintenance mode in PBX 105. Next, block 1909 executes PROC 600 and block 1910 obtains the number of outstanding alarms on the off-line processor of PBX 105. Decision block 1911 determines whether there are any outstanding alarms on the off-line processor of PBX 105. If there are no outstanding alarms, control is transferred to connector 1907 via path 1921 so that the "recommend hardware" portion of the program can be executed. If there are alarms on the off-line processor, then control is transferred via path 1922 to connector 1912 so that these off-line alarms can be displayed and eventually the "recommend hardware" portion of the program is executed.

Figure 20:
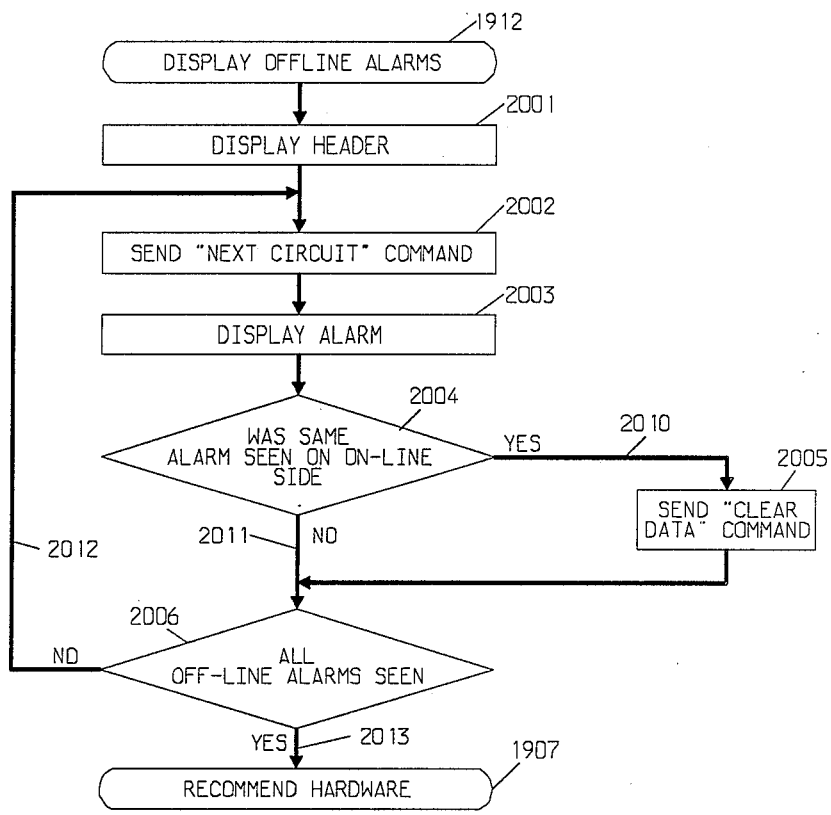

FIG. 20 illustrates the logical flow for displaying the results of the PBX 105 interrogation performed by the logical flow illustrated in FIG. 19. The logical flow of blocks 2001 through 2003 and block 2006 is similar to that of FIG. 17. The difference between FIGS. 17 and 20 is the actions taken by blocks 2004 and 2005. These two blocks determine if any alarms noted on the off-line processor of PBX 105 had been previously encountered during testing of PBX 105's on-line processor. If an alarm had been previously found during testing of the on-line processor, then that alarm is cleared in the off-line processor by block 2005 since the alarm probably resulted from an unduplicated portion of the system which was reported to both processors. After all of the off-line alarms have been displayed, control is transferred to connector 1907 via path 2013. The present example assumes that the off-line processor of PBX 105 had no alarms and results in the display illustrated in FIG. 32.

Figure 21:
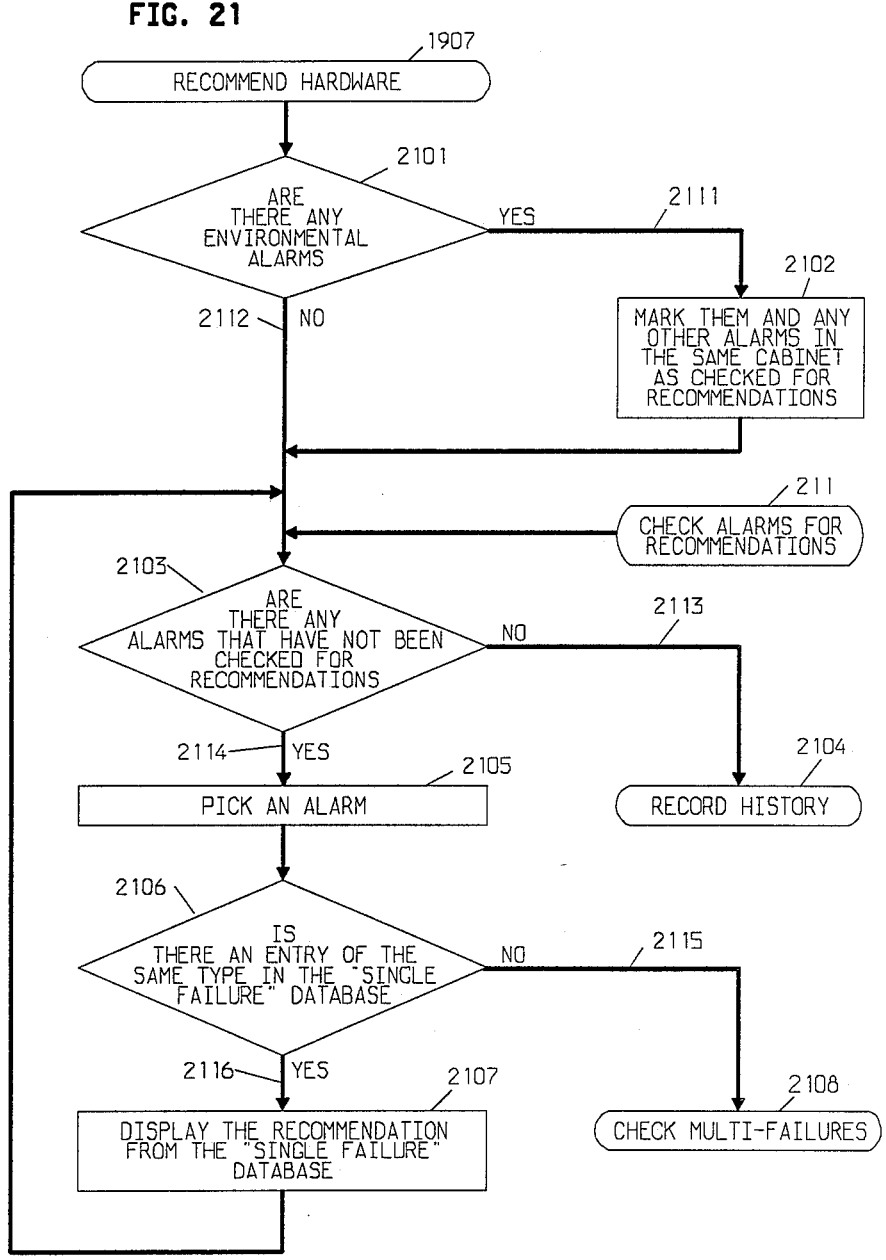

FIG. 21 illustrates the logical flow of the portion of the program that determines what replacement parts, if any, should be recommended. A service technician is dispatched to take those parts and to perform the necessary maintenance on PBX 105 to clear the alarms remaining after expert system 102 has finished the session with PBX 105. First, decision block 2101 checks if there are any environmental alarms. If there are environmental alarms, then control is transferred to block 2102 via path 2111. The reason is that an environmental alarm in a cabinet often results in spurious reports of other hardware failures within that cabinet. An example of an environmental condition is an over temperature alarm. When circuit packs are operated outside of their recommended operating temperature range, the packs exhibit error conditions that disappear when normal conditions are restored. Therefore, no hardware recommendations are made for replacement of boards operating under these conditions.

After block 2102 has been performed or if there are no environmental alarms, decision block 2103 is executed. The latter decision block determines whether there are any remaining alarms that are not in a cabinet exhibiting environmental alarms. If there are no such alarms, then control is transferred to connector 2104 via path 2113 and no recommendations will be made. If there are alarms which are not in a cabinet that has an environmental alarm, control is transferred to block 2105 via path 2114. Block 2105 picks a particular alarm. The present example uses the unit-type 2 alarm. Next, decision block 2106 checks if this alarm has an entry in the SINGLE FAILURE database illustrated in FIG. 34 for the present example. Since in the present example the unit-type 2 alarm, indicating tape unit 121, with a fault code of 925 is found within this database, control is passed via path 2116 to block 2107 which displays the recommendation from the SINGLE FAILURE database. In the present example, the recommendation is that the tape cartridge should be replaced (see FIG. 33.) For a unit-type alarm and fault code not found in the SINGLE FAILURE database, control is transferred to connector 2108 via path 2115.

Figure 22:
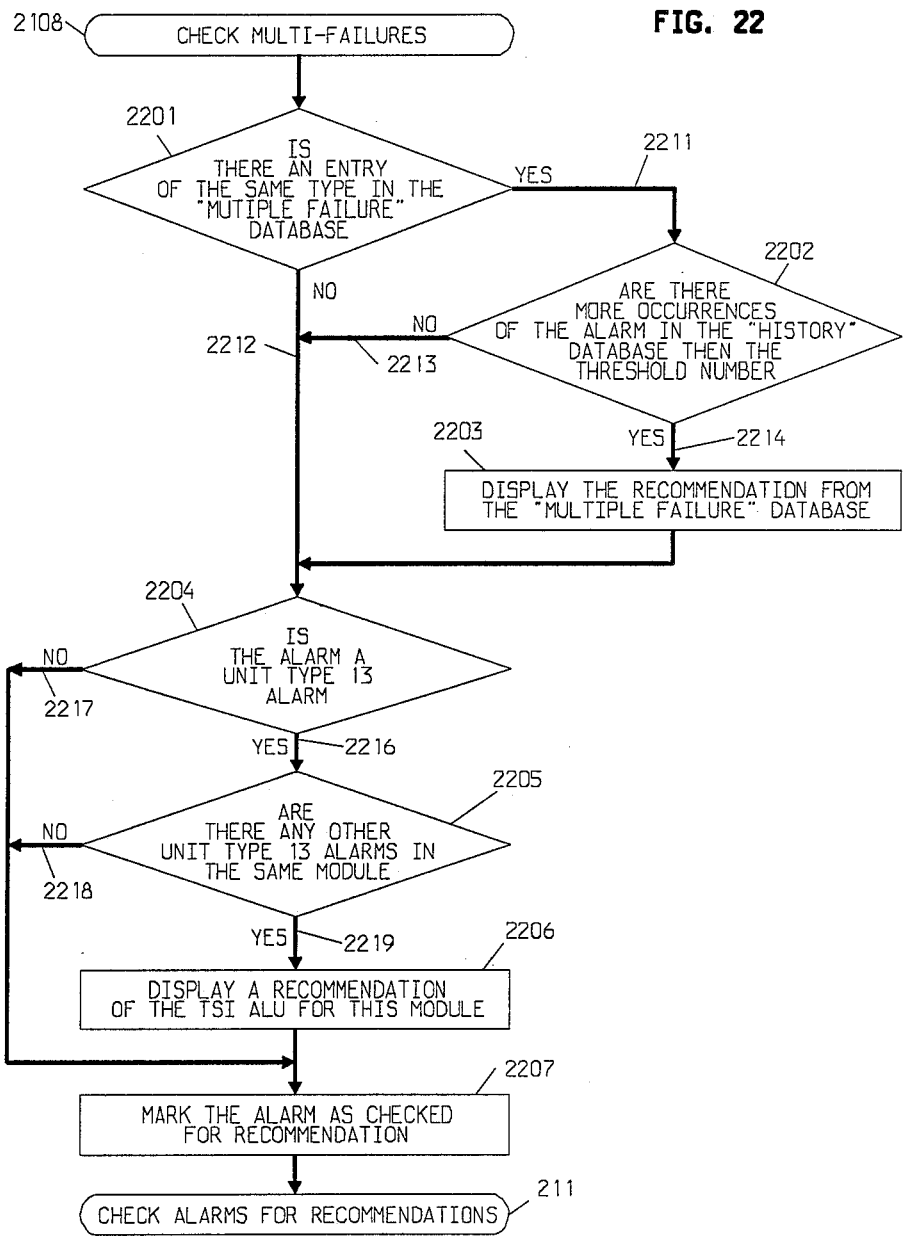

FIG. 22 illustrates the logical flow for checking whether the alarm condition is a transient one that has occurred enough times to warrant a hardware replacement. First, decision block 2201 checks if the unit-type alarm and fault code appears in the MULTI-FAILURE database, a sample entry of which is illustrated in FIG. 35. If there is an entry for the alarm under investigation within the latter database, path 2211 is followed to decision block 2202. The latter decision block first obtains from the HISTORY database the number of occurrences and time period of this particular alarm in PBX 105. This information is compared the MULTI-FAILURE database record to determine if there have been enough identical failures within the specified time interval to exceed the threshold set in the MULTI-FAILURE database. If this threshold is exceeded, then block 2203 is executed via path 2214. Block 2203 displays the replacement equipment recommendations obtained from the MULTI-FAILURE database. Blocks 2204 through 2206 governs a condition which field experience has shown to require special handling. The situation arises when multiple unit-type 13 alarms indicating failure of several port data store units appear within the same module. This condition does not indicate that the circuit packs containing the port stores should be replaced but rather that the time slot interchange arithmetic logic unit in this module is at fault and should be replaced. If decision block 2204 finds that the alarm is a unit-type 13 alarm, then decision block 2205 via path 2216 checks if other unit-type 13 alarms exist in the same module. If multiple alarms of this unit-type exist, then block 2206 is executed via path 2219. The latter block displays the recommendation that the time slot interchange arithmetic logic unit should be replaced. Finally, block 2207 is executed which marks the alarm as having been checked for a recommendation; and control is then transferred to connector 2211.

Figure 23:
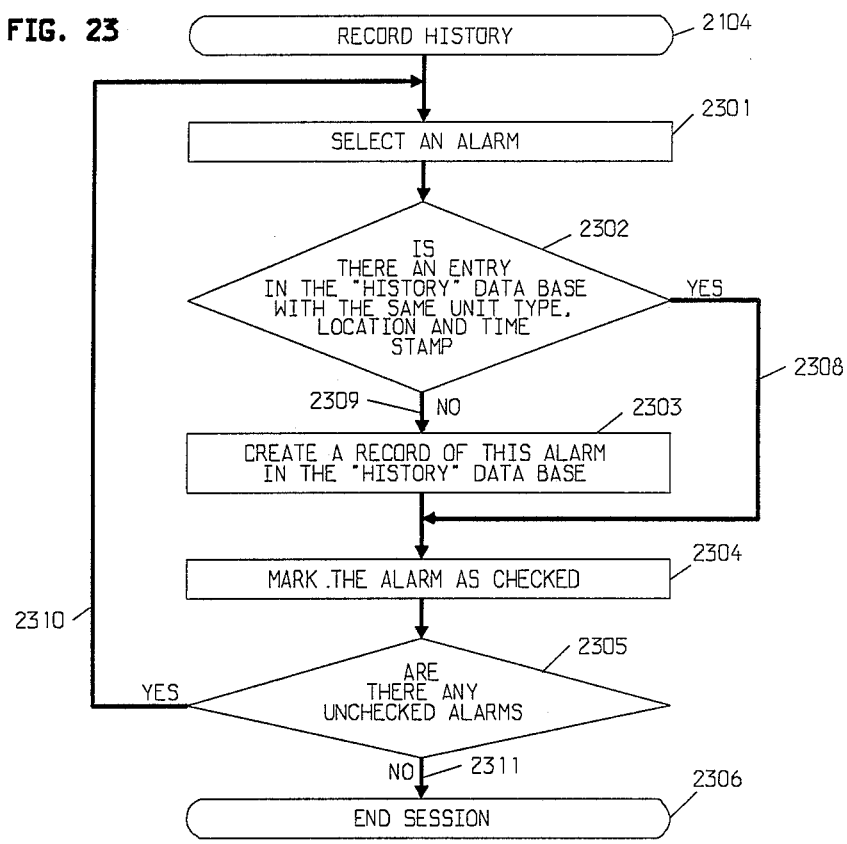

FIG. 23 illustrates the logical flow for updating the HISTORY database which contains information on the alarms handled by expert system 102 on PBX 105. To be included in the HISTORY database, the new alarm must have a time of occurrence distinct from any other occurrence of the same type and for the same facility already recorded in the HISTORY database. This time of occurrence is determined by the time stamp information received from PBX 105 by PROC 600 and is displayed in FIG. 27 in lines 2702 under the day, hour and minute columns. If decision block 2302 determines that a new entry should not be created, path 2308 is followed to block 2304. If a new entry is required, block 2303 is executed via path 2309. Block 2303 creates a new record for this alarm in the HISTORY database. If a particular component or circuit pack is failing routinely, then there will be multiple entries for that unit within the HISTORY database. Block 2304 marks the alarm as checked and decision block 2305 determines whether there are any remaining unchecked alarms for this session. If there are no remaining alarms, then path 2311 is followed to connector 2306.

Figure 24:
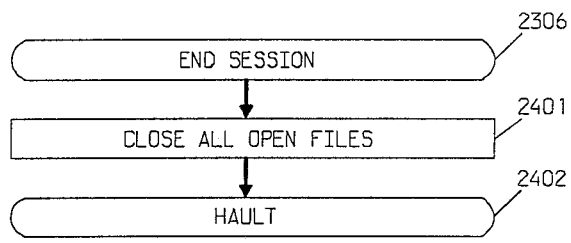

FIG. 24 shows the final steps performed to end the current PBX 105 session. Block 2401 indicates that all files are closed and the proper steps taken to exit from this session by expert system 102.

It is to be understood that the above-described embodiment is merely illustrative of the principles of the invention and that other arrangements may be devised by those skilled in the art without departing from the spirit and scope of the invention.

We claim:

1. A method for remotely maintaining computer systems by an expert system in conjunction with a central reporting center to which said computer systems report self-detected faults, comprising the steps of:
   accessing said central reporting center by said expert system to obtain the identity of one of said computer systems reporting detected faults;
   opening a maintenance session with said identified computer system by said expert system via the public telephone network in a similar manner as a human technician;
   invoking diagnostic procedures on said identified computer system by said expert system to gather data about said reported faults;
   analyzing said data to determine the severity of each of said reported faults by said expert system with respect to said reported faults being transitory and permanent type of faults; and
   clearing transitory ones of said reported faults by said expert system upon said transitory ones of said reported faults being determined to be less severity than permanent ones of said reported faults.

2. The method of claim 1 further comprising the step of establishing a plurality of databases containing field experience on components in each of said computer systems concerning replacement of said components;
   interrogating said plurality of databases for each of said permanent faults to determine when to replace components in said identified computer system; and
   displaying a message defining each of said components to be replaced.

3. The method of claim 2 further comprises the step of interrogating said plurality of databases by said expert system to determine the number of fault occurrences of each component having a transitory fault in said identified computer system;
   interrogating said plurality of databases to determine whether said number for each of said components exceeds a predefined threshold; and
   recommending replacement of each of said components whose number exceeds said predefined threshold.

4. A method for remotely maintaining telephone switching systems by an expert system in conjunction with a central reporting center to which said switching systems report self-detected faults, comprising the steps of:
   accessing said central reporting center by said expert system to obtain the identity of one of said switching systems reporting detected faults;
   opening a maintenance session with said identified switching system by said expert system via the public telephone network in a similar manner as a human technician;
   invoking diagnostic procedures on said identified switching system by said expert system to gather data about said reported faults;
   analyzing said data to determine the severity of each of said reported faults by said expert system with respect to said reported faults being transitory and permanent type of faults; and
   clearing transitory ones of said reported faults by said expert system upon said transitory ones of said reported faults being determined to be less severity than permanent ones of said reported faults.

5. The method of claim 4 further comprising the step of establishing a plurality of databases containing field experience on components in each of said switching systems concerning replacement of said components;
   interrogating said plurality of databases for each of said permanent faults to determine when to replace components in said identified switching system; and
   displaying a message defining each of said components to be replaced.

6. The method of claim 5 further comprises the step of interrogating said plurality of databases by said expert system to determine the number of fault occurrences of each of said components having a transitory fault in said identified switching system;
   interrogating said plurality of databases to determine whether said number for each of said components exceeds a predefined threshold; and
   recommending replacement of each of said components whose number exceeds said predefined threshold.

7. The method of claim 6 wherein said identified switching system has a control computer including duplicated processors with one of said processors actively controlling said identified switching system and the other of said processors being in a standby condition, the method further comprising the step of testing said other processor in said standby condition.

8. The method of claim 7 wherein said switching systems are of different manufactured vintages and said invoking step comprises the step of requesting from said identified switching system the vintage of said identified switching system thereby being able to utilize the correct diagnostic procedures.

9. A method for remotely determining replacement of components in telephone switching systems by an expert system in conjunction with a central reporting center to which said switching systems report self-detected faults, comprising the steps of:
   maintaining a history database of said expert system to record detected faults by component type and component location and time of fault for each of said switching systems;
   maintaining a multifault database to store on the basis of field experience recommendations on the replacement of components in said switching systems on the basis of component type and component location and time of fault by said expert system;
   accessing said central reporting center by said expert system to obtain the identity of one said switching systems reporting detected faults;
   opening a maintenance session with said identified switching system by said expert system in a similar manner as used by a human technician;
   invoking diagnostic procedures on said identified switching system by said expert system to gather data about said reported faults and the gathered data including component type and component location and time of fault;
   analyzing said data to determine the severity of each of said reported faults by said expert system with respect to being transitory and permanent types of faults;
   interrogating said history database with the gathered data by said expert system to determine the number of fault occurrences of each of said components having a transitory fault in said identified switching system; and recommending replacement of each of said components having said number that exceeds a predefined threshold in said multifault database.

10. The method of claim 9 further comprising the step of maintaining a single fault database to store on the basis of field experience recommendations on the replacement of components for permanent type faults on the basis of component type and component location by said expert system;

interrogating said single fault database by said expert system for each of said components having a permanent fault in said identified switching systems; and recommending replacement of each of said components found in said single fault database.

11. The method of claim 10 wherein said step of recommending comprises the step of displaying information to dispatch a service technician to replace the recommended components.

12. The method of claim 11 wherein said step of opening comprises the steps of dialing a connection via a public telephone network to said identified switching system; and logging on to said identified switching system by said expert system.

13. The method of claim 12 wherein said interrogating step of said history database comprises the step of clearing each of said transitory fault not having an occurrence in said history database.

14. The method of claim 13 wherein said identified switching system has a control computer including duplicated processors with one of said processors actively controlling said identified switching system and the other of said processors being in a standby condition, the method further comprising the step of testing said other processor in said standby condition.

15. The method of claim 14 wherein said switching systems are of different manufactured vintages and said invoking step comprises the step of requesting from said identified switching system the vintage of said identified switching system thereby being able to utilize the correct diagnostic procedures.

* * * * *